(12) United States Patent
Matsuura et al.

(10) Patent No.: US 9,487,085 B2
(45) Date of Patent: Nov. 8, 2016

(54) TRANSAXLE AND WORKING VEHICLE EQUIPPED WITH THE TRANSAXLE

(71) Applicant: KANZAKI KOKYUKOKI MFG. CO., LTD., Amagasaki-shi (JP)

(72) Inventors: Jun Matsuura, Amagasaki (JP); Koji Iwaki, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 14/697,163

(22) Filed: Apr. 27, 2015

(65) Prior Publication Data
US 2015/0306954 A1 Oct. 29, 2015

(30) Foreign Application Priority Data
Apr. 28, 2014 (JP) .................. 2014-092768

(51) Int. Cl.
| | |
|---|---|
| B60K 17/346 | (2006.01) |
| B60K 17/10 | (2006.01) |
| B60K 17/28 | (2006.01) |
| B60K 17/35 | (2006.01) |
| B60K 5/02 | (2006.01) |
| B60K 5/00 | (2006.01) |
| F16H 47/02 | (2006.01) |

(52) U.S. Cl.
CPC ......... *B60K 17/3462* (2013.01); *B60K 17/105* (2013.01); *B60K 17/28* (2013.01); *B60K 17/35* (2013.01); *B60K 5/02* (2013.01); *B60K 2005/003* (2013.01); *B60Y 2300/58* (2013.01); *F16H 47/02* (2013.01)

(58) Field of Classification Search
CPC .. B60K 5/02; B60K 2005/003; B60K 17/28; B60K 17/105; B60K 17/3462
USPC .......................................................... 180/223
See application file for complete search history.

(56) References Cited

U.S. PATENT DOCUMENTS

| | | | | |
|---|---|---|---|---|
| 5,277,270 A | * | 1/1994 | Hasegawa ................ | B60G 9/04 180/291 |
| 6,237,708 B1 | * | 5/2001 | Kawada .................. | B60K 17/28 180/53.7 |
| 2007/0245726 A1 | * | 10/2007 | Iwaki ..................... | B60K 17/30 60/487 |

FOREIGN PATENT DOCUMENTS

JP     2007-22379     2/2007

* cited by examiner

*Primary Examiner* — Joseph Rocca
*Assistant Examiner* — Felicia L Brittman
(74) *Attorney, Agent, or Firm* — Sterne, Kessler, Goldstein & Fox P.L.L.C.

(57) ABSTRACT

A transaxle is adaptable to a vehicle equipped with a longitudinal engine including an engine output shaft to be oriented in a longitudinal direction of a vehicle. The transaxle comprises a transmission output shaft to be oriented in a lateral direction of the vehicle so as to be drivingly connected to a drive wheel of the vehicle, a hydrostatic transmission and a mechanical transmission for transmitting power from the engine output shaft to the transmission output shaft, and first and second power take-off shafts for taking off power from the mechanical transmission. The engine is joined to the transaxle so that the engine, the hydrostatic transmission and the mechanical transmission are assembled together. The first and second power take-off shafts are distributed rightward and leftward from the engine.

6 Claims, 12 Drawing Sheets

TRANSAXLE AND WORKING VEHICLE EQUIPPED WITH THE TRANSAXLE

CROSS-REFERENCE TO RELATED APPLICATIONS

The present application claims priority to Japanese Patent Application No. 2014-092768, filed on Apr. 28, 2014.

BACKGROUND OF THE INVENTION

1. Field of the Invention

The present invention relates to a configuration of an apparatus serving as a transaxle for a working vehicle equipped with a longitudinal engine, and relates to a working vehicle equipped with such an apparatus.

2. Related Art

An engine having a horizontal engine output shaft extended in the longitudinal (i.e., fore-and-aft) direction of a vehicle is referred to as a "longitudinal engine." There is a well-known conventional working vehicle (e.g., a utility vehicle) equipped with a longitudinal engine and a transmission assembly including a hydrostatic transmission (hereinafter, "HST") and a mechanical transmission (e.g., a gear transmission), as disclosed by JP 2007-22379 A. In this vehicle, the HST and the mechanical transmission are configured to transmit power from the longitudinal engine output shaft to a transmission output shaft (e.g., right and left differential output shafts) extended in the lateral direction of the vehicle and drivingly connected to an axle of a drive wheel. The mechanical transmission is arranged to have its transmission shafts extended parallel to the transmission output shaft (i.e., in the lateral direction of the vehicle), thereby being minimized in the longitudinal direction of the vehicle. The HST is disposed on one of right and left sides of the mechanical transmission so as to extend laterally from the mechanical transmission instead of extending rearward from the mechanical transmission, thereby improving the turning performance of the vehicle, and improving the protection of the HST.

The vehicle has some problems. First, the vehicle is wrongly balanced so as to spoil its stability in traveling because the heavy engine is disposed laterally eccentrically in the vehicle. Second, the vehicle has to increase its size and the number of its component parts because the engine is separated from the transmission assembly and needs its own fixture member and a space separated from the transmission assembly. Third, the working vehicle also has to increase its size, especially in the longitudinal direction, because it has several power take-off (hereinafter, "PTO") shafts including a front wheel driving PTO shaft and a working device driving PTO shaft, the front wheel driving PTO shaft being offset laterally from the engine, while the working device driving PTO shaft being extended rearward from the transmission assembly. Fourth, the transmission assembly has to have a portion where plural PTO shafts are collected and supported, thereby reducing durability of component parts in the portion and tending to cause noise from the portion.

SUMMARY OF THE INVENTION

A first object of the invention is to provide a transaxle appropriately configured for a working vehicle that should have a longitudinal engine and at least two PTO shafts.

To achieve the object, a transaxle according to the invention is adaptable to a vehicle equipped with a longitudinal engine including an engine output shaft to be oriented in a longitudinal direction of the vehicle. The transaxle comprises a transmission output shaft to be oriented in a lateral direction of the vehicle so as to be drivingly connected to a drive wheel of the vehicle, an HST and a mechanical transmission for transmitting power from the engine output shaft to the transmission output shaft, and first and second PTO shafts for taking off power from the mechanical transmission. The engine is joined to the transaxle so that the engine, the HST and the mechanical transmission are assembled together. The first and second PTO shafts are distributed rightward and leftward from the engine.

Due to the configuration of the transaxle, the heavy longitudinal engine can be disposed in the lateral middle portion of the vehicle so as to laterally balance the vehicle. Further, due to the assembling of the engine together with the HST and the mechanical transmission, the engine approaches the HST and the mechanical transmission, so that a common support member can be used to support the engine, the HST and the mechanical transmission, and a space for mounting the engine can be reduced so as to reduce a size of a fixture member for the engine, thereby minimizing the vehicle and reducing costs for supplying component parts. Further due to the distribution of the first and second PTO shafts, the vehicle is further minimized, and the mechanical transmission is released from a load caused by collecting PTO shafts at only one place, thereby enhancing the durability of component parts and reducing noise.

Preferably, the transaxle further comprises a transmission casing of the mechanical transmission, a common input shaft for the HST and the mechanical transmission, and first and second drive trains disposed in the transmission casing. The transmission casing includes upper and lower portions. The input shaft is drivingly connected to the engine output shaft. The HST is attached to a right or left outer side of the upper portion of the transmission casing so as to extend laterally outward from the upper portion of the transmission casing. The input shaft and the transmission output shaft are disposed at an equal level in the lower portion of the transmission casing. The first drive train is extended upward from the input shaft so as to transmit power from the input shaft to the HST. The second drive train is extended downward from the HST to the transmission output shaft so as to transmit power from the HST to the transmission output shaft.

Due to the configuration of the transaxle, a level of a fluid sump in the transmission casing can be set so that only the input shaft, the transmission output shaft, and gears on the input shaft and the transmission output shaft are submerged in a fluid sump in the transmission casing. Remaining components for the mechanical transmission are disposed above the level of the fluid sump so as to be lubricated directly or via the first or second drive train with fluid splashed up from the fluid sump agitated by the gears on the input shaft and the transmission output shaft. Therefore, the fluid sump can be volumetrically reduced so as to reduce agitation resistance of the fluid and heating of the fluid, thereby reducing energy loss and running costs.

Preferably, the transaxle further comprises a transmission casing of the mechanical transmission, a flywheel casing, a differential unit and a reservoir tank. The flywheel casing is disposed between the engine and the transmission casing. The transmission casing includes a first portion close to the flywheel casing and a second portion away from the flywheel casing. The differential unit is disposed in the second portion of the transmission casing and is drivingly connected to the transmission output shaft. The reservoir tank is disposed in a space below the first portion of the transmission casing between the flywheel casing and the second portion of the transmission casing and is fluidly connected to an inside of the transmission casing.

Therefore, such a dead space is used for arranging the reservoir tank, thereby ensuring the compactness of the transaxle joined to the engine and provided with the reservoir tank. The reservoir tank can be used for a stable fluid supply for hydraulic devices in the vehicle, including the HST, while a fluid sump in the inside of the transmission casing may be unstable for such a fluid supply because of tilt of the vehicle during traveling, for example. Further, due to the reservoir tank, the fluid sump in the inside of the transmission casing can be volumetrically reduced so as to reduce agitation resistance of the fluid and heating of the fluid, thereby reducing energy loss and running costs.

A second object of the invention is to provide a working vehicle appropriately configured to have a longitudinal engine and at least two PTO shafts.

To achieve the second object, a vehicle according to the invention comprises a longitudinal engine and a transaxle. The engine includes an engine output shaft to be oriented in a longitudinal direction of the vehicle. The transaxle includes a transmission output shaft to be oriented in a lateral direction of the vehicle so as to be drivingly connected to a drive wheel of the vehicle, an HST and a mechanical transmission for transmitting power from the engine output shaft to the transmission output shaft, and first and second PTO shafts for taking off power from the mechanical transmission. The engine is joined to the transaxle so that the engine, the HST and the mechanical transmission are assembled together. The first and second PTO shafts are distributed rightward and leftward from the engine.

Due to the configuration of the vehicle, the vehicle can have the heavy longitudinal engine mounted at the lateral middle portion of the vehicle, thereby being laterally balanced. Further, due to the assembling of the engine together with the HST and the mechanical transmission, the engine approaches the HST and the mechanical transmission, so that a common support member can be used to support the engine, the HST and the mechanical transmission, and a space for mounting the engine can be reduced so as to reduce a size of a fixture member for the engine, thereby minimizing the vehicle and reducing costs for supplying component parts. Further due to the distribution of the first and second PTO shafts, the vehicle is further minimized, and the mechanical transmission is released from a load caused by collecting PTO shafts at only a place, thereby enhancing the durability of component parts and reducing noise.

Preferably, the transaxle in the vehicle has the above-mentioned preferable configuration so as to bring the above-mentioned effects on the vehicle.

These and other objects, features and advantages of the invention will appear more fully from the following detailed description of the invention with reference to the attached drawings.

DETAILED DESCRIPTION OF THE INVENTION

Figure 1:
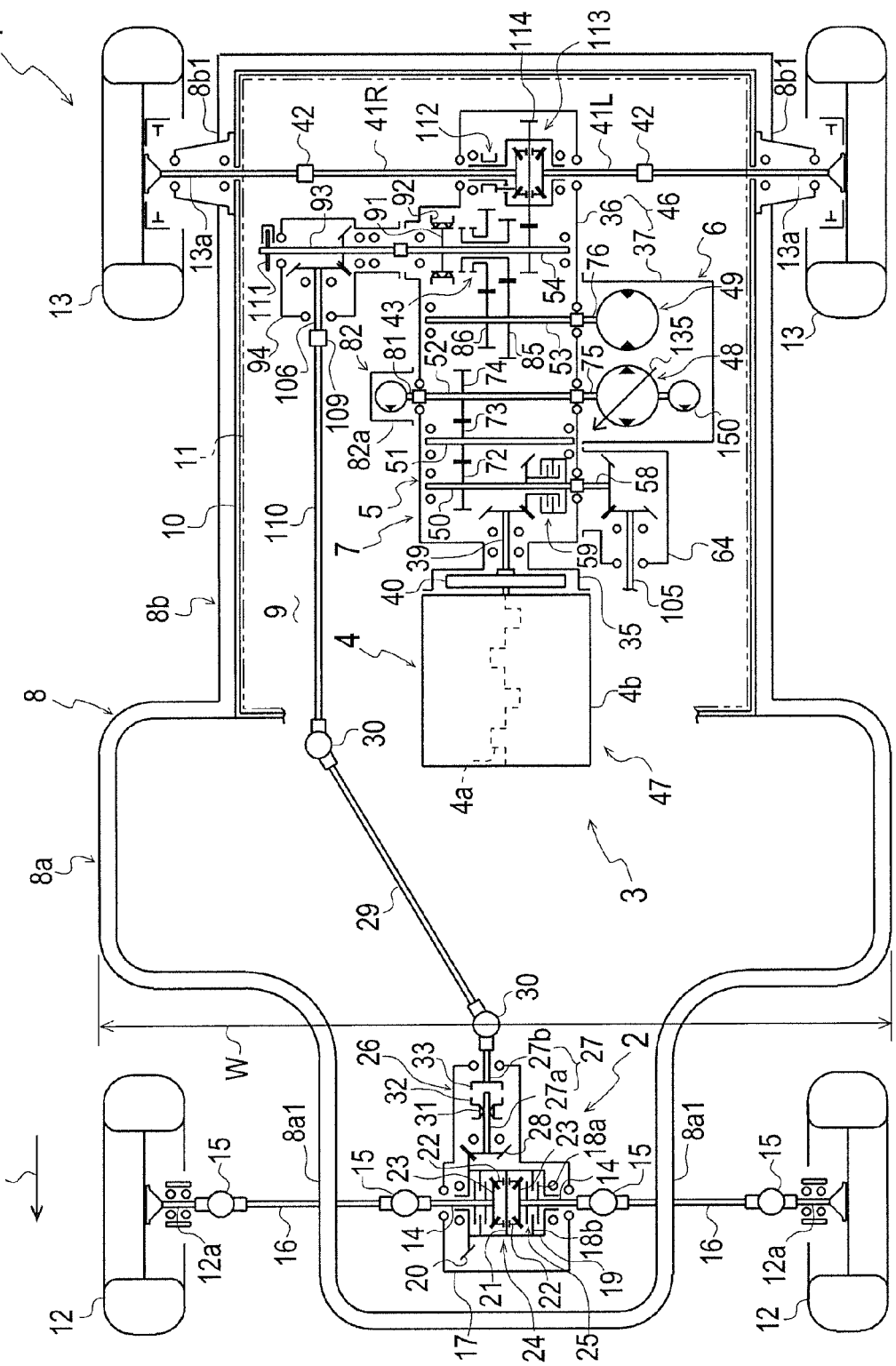
FIG. 1 is a schematic plan view of an entire working vehicle equipped with an engine-transaxle assembly including a transaxle.

Hereinafter, descriptions will be given on an assumption that a utility vehicle 1 equipped with an engine-transaxle assembly 3 faces forward in a direction designated by an arrow F as shown in FIG. 1, and words "longitudinal" and "longitudinally" will be used on an assumption that they are only defined as meaning the fore-and-aft direction of utility vehicle 1.

Figure 2:
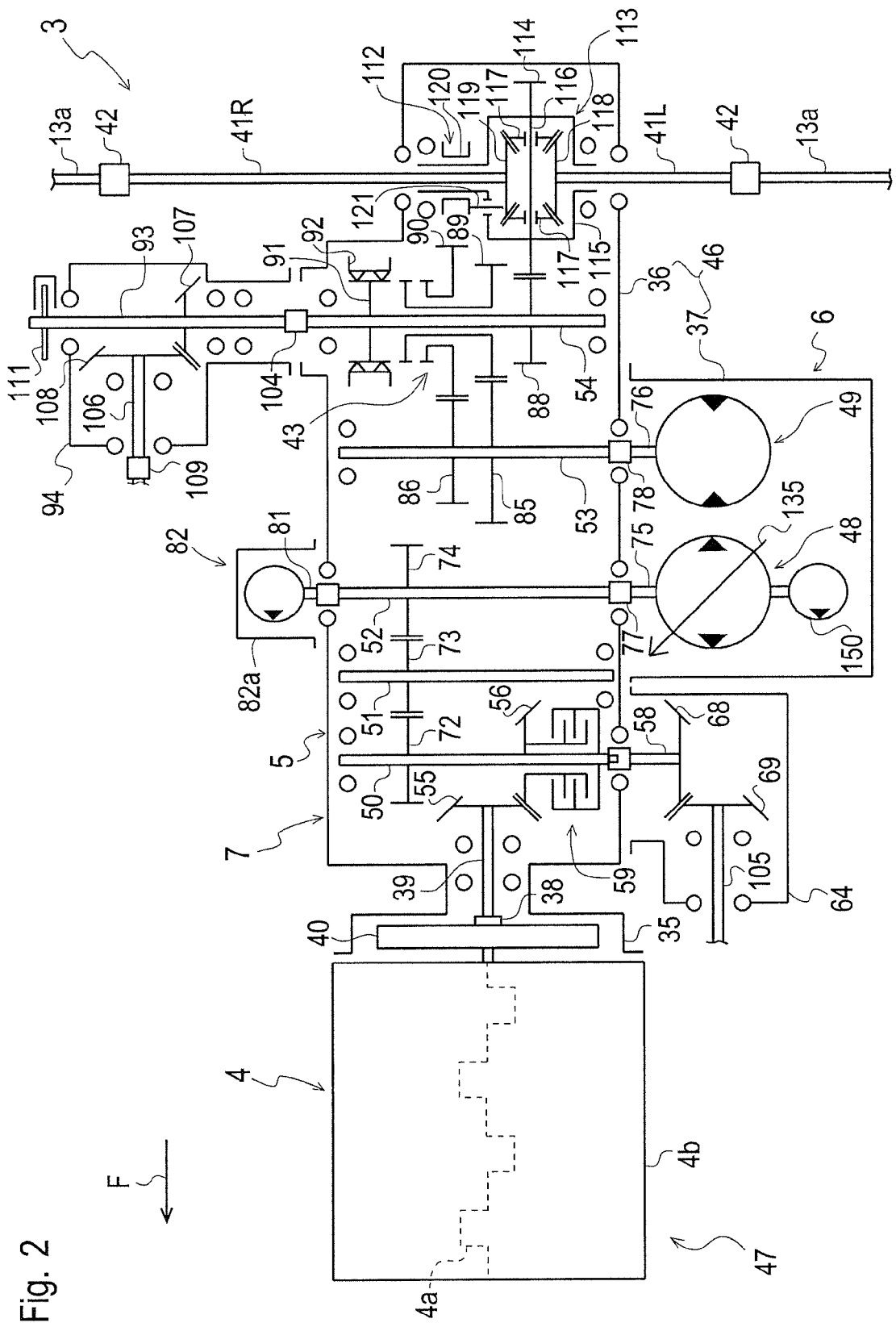
FIG. 2 is a schematic plan view of the engine-transaxle assembly.

Referring to FIGS. 1 and 2, entire utility vehicle 1 will be described. Utility vehicle 1 is provided with a vehicle body frame 8 including a front frame 8a and a rear frame 8b joined to each other. A front portion of front frame 8a is laterally narrowed so as to serve as a front wheel support portion 8a1 carrying right and left front wheels 12 on right and left outer sides thereof. Rear frame 8b having a constant lateral width carries right and left rear wheels 13 on right and left outer sides of a rear portion thereof serving as a rear wheel supporting portion 8b1. A horizontal platform 9 which is substantially rectangular when viewed in plan is spread inside rear frame 8b. Vertical side plates 10 are extended upright from front, rear, right and left ends of platform 9. A dump bed 11 is vertically rotatably mounted on the tops of side plates 10.

An engine-transaxle assembly 3 is settled on platform 9. A front transaxle 2 is disposed inside of front wheel supporting portion 8a1. Engine-transaxle assembly 3 includes a later-discussed PTO section from which power is transmitted to front transaxle 2. Engine-transaxle assembly 3 is a combination of a longitudinal engine 4 and a rear transaxle 7. Rear transaxle 7 includes a mechanical transmission 5 and an HST 6. HST 6 serves as a main transmission that transmits power from engine 4 to a sub transmission 43 of mechanical transmission 5, and sub transmission 43 transmits power from HST 6 to right and left rear wheels 13. In other words, longitudinal engine 4, HST 6, and mechanical transmission 5 are assembled together so as to constitute engine-transaxle assembly 3.

Engine-transaxle assembly 3, i.e., rear transaxle 7, carries right and left differential output shafts 41R and 41L coupled to coaxial axles 13a of respective right and left rear wheels 13 via respective coupling sleeves 42. Front transaxle 2 carries right and left differential output shafts 14 drivingly connected to axles 12a of respective right and left steerable front wheels 12 via respective propeller shafts 16 with universal joints 15. Front wheel supporting portion 8a1 of front frame 8 suspends right and left front wheels 12 via ordinary suspensions having coiled springs or shock absorbers.

Front transaxle 2 includes a transaxle casing 17 incorporating a front differential unit 24 that differentially connects proximal ends of right and left differential output shafts 14 to each other. Transaxle casing 17 also incorporates a differential locking mechanism 25 for front differential unit 24, and a drive mode selection clutch 26 on the drive train to front differential unit 24.

Front differential unit 24 includes a differential casing 19, a differential ring gear 20, a pinion shaft 21, differential pinions 22, and right and left differential side gears 23. Differential casing 19 fittingly supports right and left differential output shafts 14 coaxial to each other so as to allow right and left differential output shafts 14 to rotate relative to differential casing 19. In differential casing 19, right and left bevel gears serving as right and left differential side gears 23 are fixed on respective proximal end portions of differential output shafts 14. In differential casing 19, pinion shaft 21 having bevel pinions serving as differential pinions 22 thereon is disposed between right and left differential side gears 23, and is extended perpendicular to differential output shafts 14 so that right and left differential side gears 23 mesh with each differential pinion 22 therebetween. A bevel ring gear serving as differential ring gear 20 is fixed on an outer peripheral surface of differential casing 19.

Differential locking mechanism 25 includes alternately layered friction elements 18a and 18b. Friction elements 18a engage with differential output shaft 14 unrotatably relative to differential output shaft 14. Friction elements 18b engage with an inner peripheral portion of differential casing 19 unrotatably relative to differential casing 19. A pressure member (not shown) for pressing friction elements 18a and 18b, e.g., a slidable ring and a fork, is interlockingly connected to a differential locking manipulator, e.g., a lever or a pedal. Friction elements 18a and 18b can be pressed against one another by operating the differential locking manipulator so as to lock right and left differential output shafts 14 to each other via differential casing 19. Further, differential locking mechanism 25 may be configured so that friction elements 18a and friction elements 18b have adjustable frictional pressure therebetween so as to provide front differential unit 24 as a limited slip differential unit.

An input shaft 27 is extended in the fore-and-aft direction rearward from front differential unit 24 and is journalled by a rear portion of transaxle casing 17. Input shaft 27 is divided into coaxial front and rear shafts 27a and 27b. A bevel gear 28 is fixed on a front end portion of front shaft 27a, and meshes with differential ring gear 20. A rear end portion of rear shaft 27b projects rearward from transaxle casing 17, and is coupled to a front end of a propeller shaft 29 via a universal joint 30 so as to receive power from a later-discussed PTO shaft 106 of rear transaxle 7 of engine-transaxle assembly 3.

In transaxle casing 17, drive mode selection clutch 26 is interposed between front and rear shaft 27a and 27b. Drive mode selection clutch 26 includes a clutch slider 31, clutch teeth 32 formed on a rear end portion of clutch slider 31, and clutch teeth 33 formed on a front end portion of rear shaft 27b. Clutch slider 31 is fitted on front shaft 27a so that clutch slider 31 is axially slidable along front shaft 27a, however, is unrotatable relative to front shaft 27a. Clutch slider 31 is operatively connected to a drive mode selection manipulator (not shown), e.g., a lever. Due to manipulation of the drive mode selection manipulator, clutch slider 31 selectively slides rearward to engage clutch teeth 32 with clutch teeth 33 so as to engage drive mode selection clutch 26, or forward to disengage clutch teeth 32 from clutch teeth 33 so as to disengage drive mode selection clutch 26. By engaging drive mode selection clutch 26, utility vehicle 1 is set in 4WD mode where traveling of utility vehicle 1 relies on driving of all front wheels 12 and rear wheels 13. By disengaging drive mode selection clutch 26, utility vehicle 1 is set in 2WD mode where traveling of utility vehicle 1 relies on driving of only rear wheels 13.

Referring to FIGS. 1 to 9, engine-transaxle assembly 3, including longitudinal engine 4 and rear transaxle 7, will be described in detail. As shown in FIGS. 1 to 3 and 8, engine 4 includes a crankcase 4b incorporating a crankshaft 4a extended longitudinally, i.e., in the fore-and-aft direction of utility vehicle 1. A flywheel 40 is fixed on a rear end portion of crankshaft 4a. An engine output shaft 39 is extended coaxially rearward from crankshaft 4a, and is spline-fitted at a front end portion into a coupling sleeve 38 coupled via a damper to flywheel 40. A flywheel casing 35 is fixed to a rear end of crankcase 4b of engine 4 so as to incorporate flywheel 40, coupling sleeve 38 and the front end portion of engine output shaft 39 spline-fitted into coupling sleeve 38.

Figure 3:
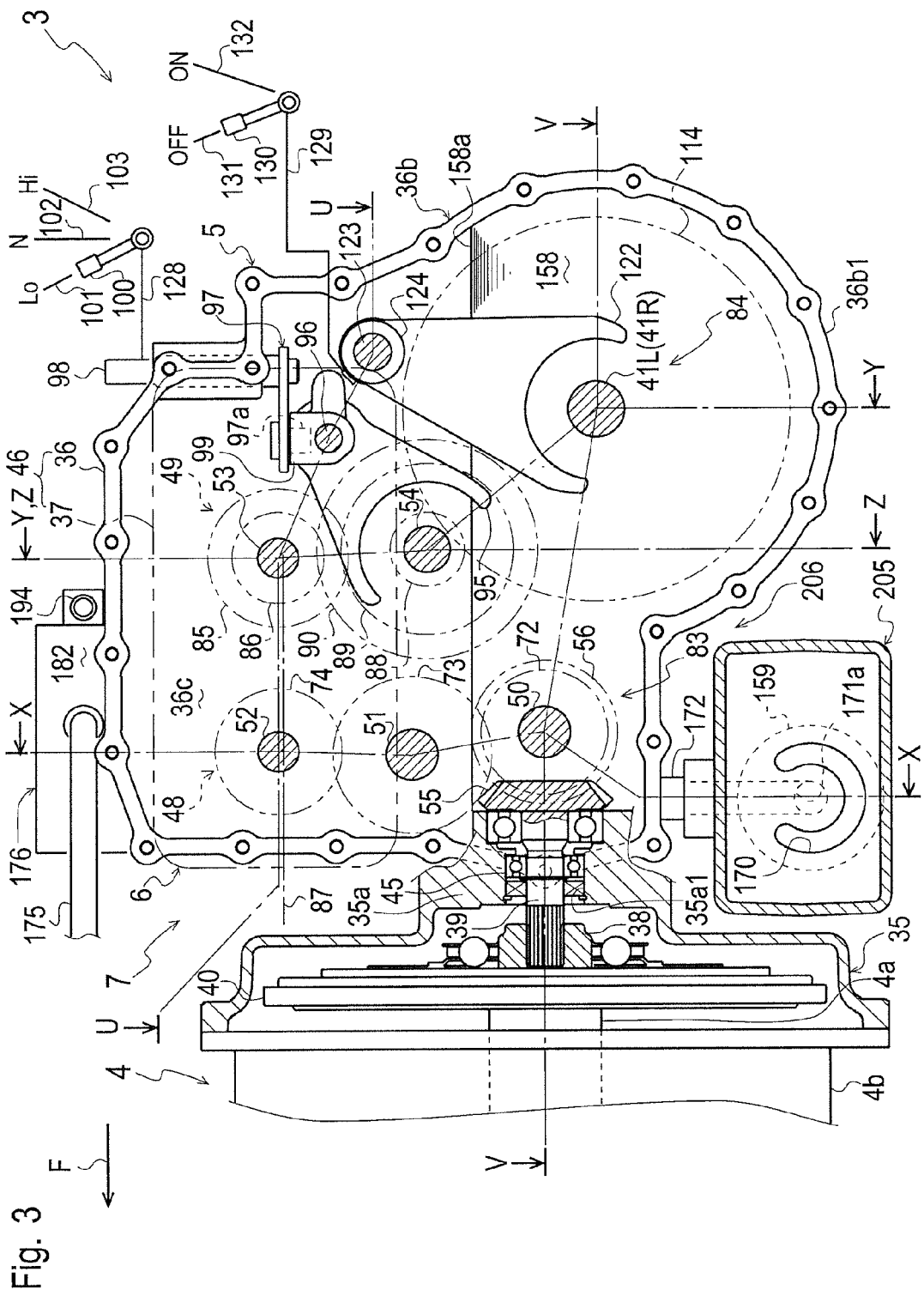
FIG. 3 is a sectional side view of the engine-transaxle assembly.
Figure 8:
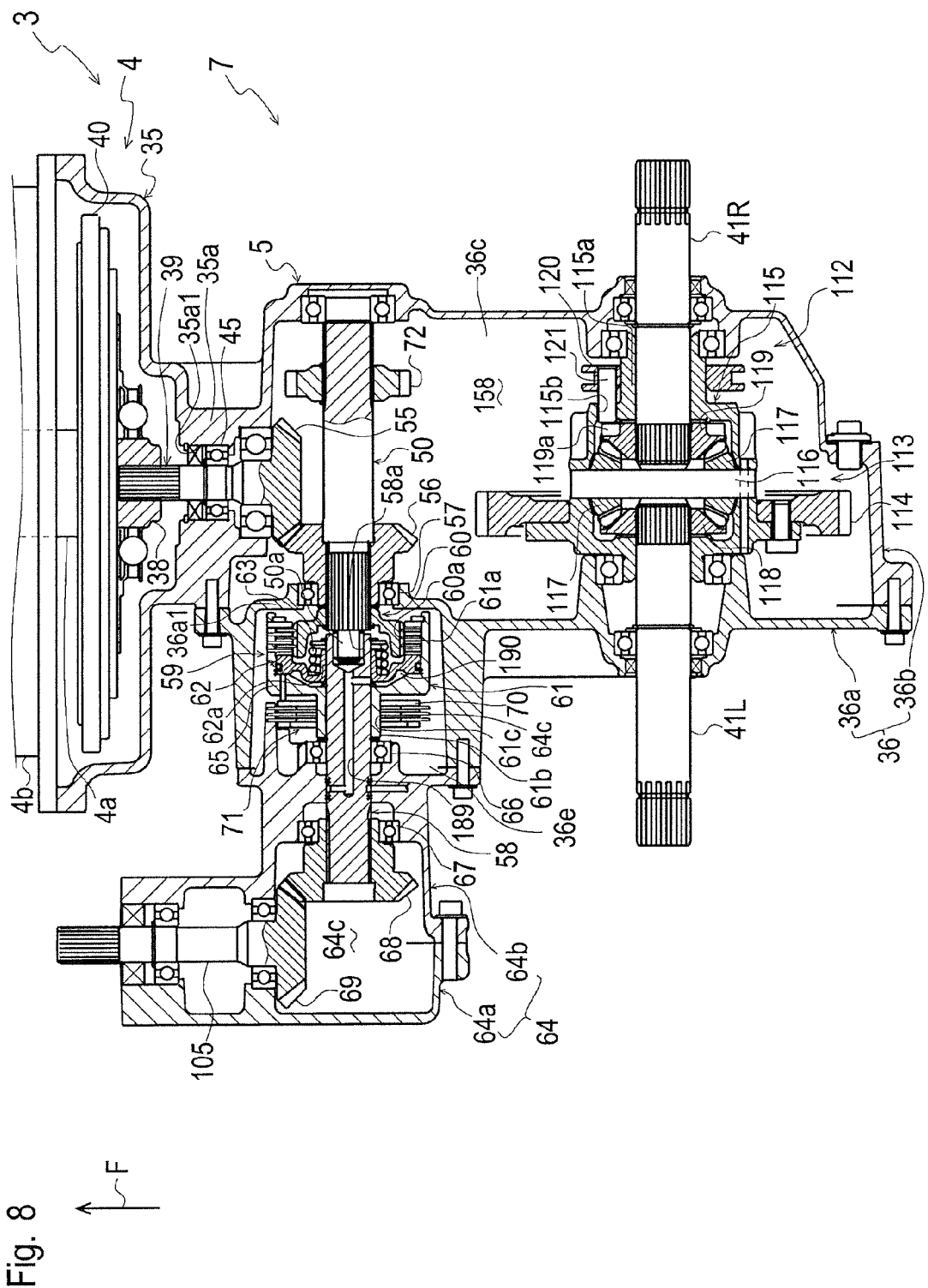
FIG. 8 is a cross sectional view of the engine-transaxle assembly taken along the V-V line of FIG. 3.

As shown in FIGS. 3 and 8, flywheel casing 35 is formed at a rear portion thereof with a boss 35a having a through hole 35a1. Engine output shaft 39 is journalled at an axial intermediate portion thereof by a bearing 45 fitted in through hole 35a1. Boss 35a is also formed as a front portion of a side housing 36a of a gear transmission casing 36. In other words, flywheel casing 35 and side housing 36a of gear transmission casing 36 are formed integrally with each other so as to have boss 35a therebetween. Alternatively, flywheel casing 35 may be separate from gear transmission casing 36, and may be fastened to gear transmission casing 36 via a bolt. In this case, boss 35a may be formed integrally with either flywheel casing 35 or gear transmission casing 36, or may be separate from both flywheel casing 35 and gear transmission casing 36.

As shown in FIGS. 4 to 8, side housing 36a and a main housing 36b are joined to each other at a longitudinal and vertical joint plane so as to constitute gear transmission casing 36. Further, as shown in FIGS. 4 to 7, a center section 34 of HST 6 having an HST casing 37 attached thereon is joined to side housing 36a of gear transmission casing 36 opposite main housing 36b, so that HST casing 37, center section 34, and gear transmission casing 36 are joined to one another to constitute a transaxle casing 46 of rear transaxle 7. Therefore, crankcase 4b of engine 4 and transaxle casing 46 are joined to each other so as to constitute an engine-transaxle assembly casing 47 of entire engine-transaxle assembly 3.

As shown in FIG. 1, utility vehicle 1 has a lateral width W, and engine-transaxle assembly 3 is located in utility vehicle 1 so that heavy engine 4 is located at the laterally middle position in the direction of lateral width W so as to balance utility vehicle 1 in the lateral direction. Gear transmission casing 36 of transaxle casing 46 is extended rearward from engine 4, so that, as discussed later, HST 6 (including center section 34 and HST casing 37) and a first PTO casing 64 are disposed on one of right and left sides (in this embodiment, the left side) of gear transmission casing 36, and a second PTO casing 94 is disposed on the other of right and left sides (in this embodiment, the right side) of gear transmission casing 36.

Hereinafter, engine-transaxle assembly 3 will be described on the assumption that HST 6 and first PTO casing 64 are disposed on the left side of gear transmission casing 36, and second PTO casing 94 is disposed on the right side of gear transmission casing 36. On this assumption, side housing 36a is joined to a left open end of main housing 36b.

Side housing 36a and main housing 36b are joined to each other to constitute gear transmission casing 36 defining a main chamber 36c therein. In this regard, side housing 36a is formed with a bearing wall 36a1 that is extended substantially vertically and longitudinally so as to define the left end of main chamber 36c. A right end wall portion of main housing 36b is extended substantially vertically and longitudinally so as to define the right end of main chamber 36c.

Mechanical transmission 5 includes transmission shafts 50, 51, 52, 53 and 54, i.e., input shaft 50, counter shaft 51, main transmission input shaft 52, sub transmission input shaft (or main transmission output shaft) 53, and sub transmission output shaft 54, which are journalled in gear transmission casing 36 to transmit power from engine output shaft 39 to right and left differential output shafts 41R and 41L. In main chamber 36c, transmission shafts 50, 51, 52, 53 and 54 are extended in the lateral direction of utility vehicle 1 in parallel to each other and perpendicular to engine output shaft 39.

Referring to FIGS. 1 to 4 and 8, input shaft 50 is spanned in a lower front portion of main chamber 36c between bearing wall 36a1 of side housing 36a and the right end wall portion of main housing 36b. A bevel gear 56 is fixed on a left end portion of input shaft 50, and is fitted into a bearing 57 disposed in a lower front portion of bearing wall 36a1, so that the left end portion of input shaft 50 with bevel gear 56 is journalled by the lower front portion of bearing wall 36a1 via bearing 57. A bevel gear 55 is formed (or fixed) on a rear end portion of engine output shaft 39, and meshes with bevel gear 56 so as to transmit power from engine output shaft 39 to input shaft 50. In this regard, engine output shaft 39 is disposed at or close to the lateral center position of main chamber 36c, and bevel gear 56 is disposed leftward from the axis of engine output shaft 39 so as to mesh with a left portion of bevel gear 55.

Figure 4:
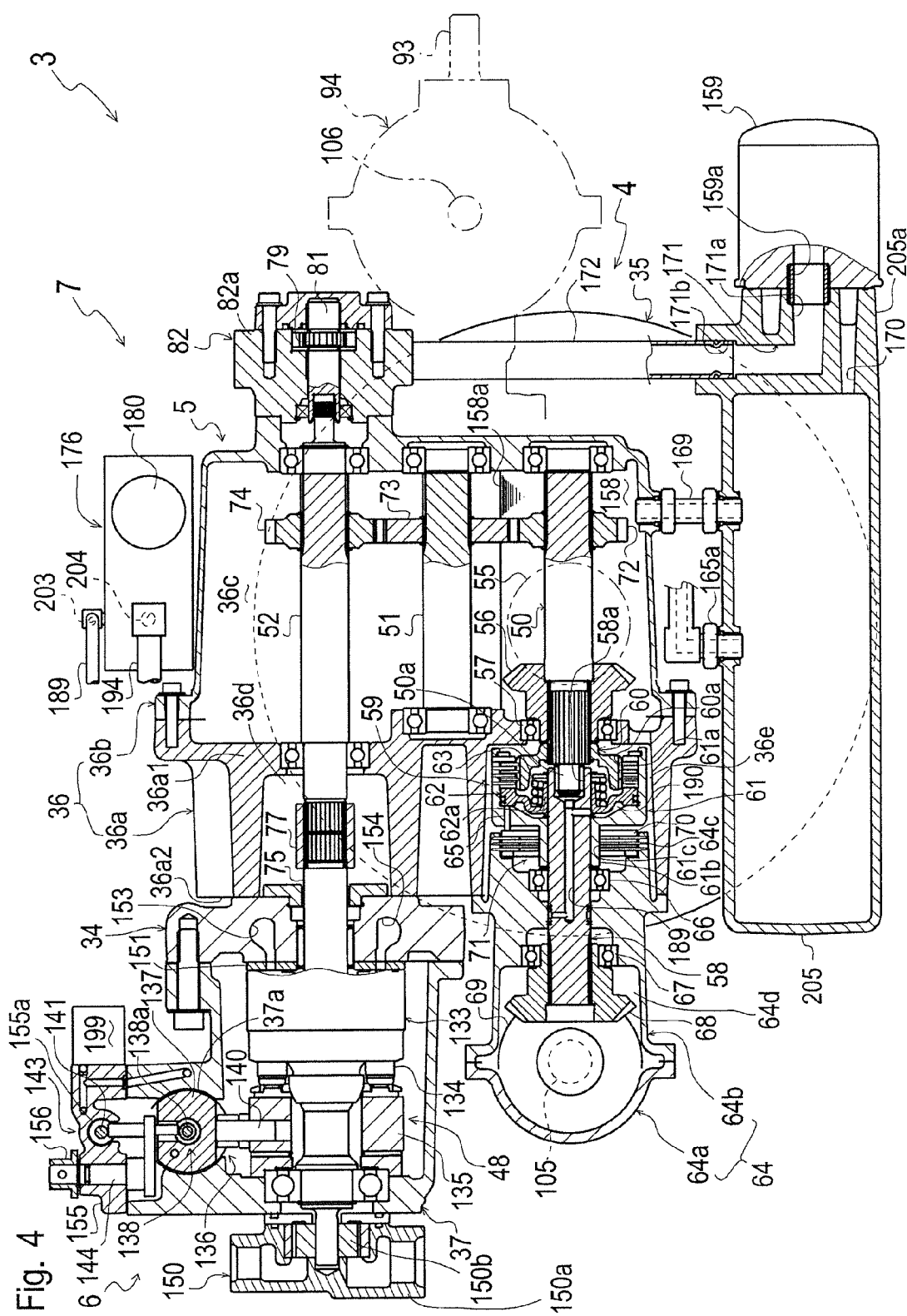
FIG. 4 is a cross sectional view of the engine-transaxle assembly taken along the X-X line of FIG. 3, showing a first drive train.
Figure 5:
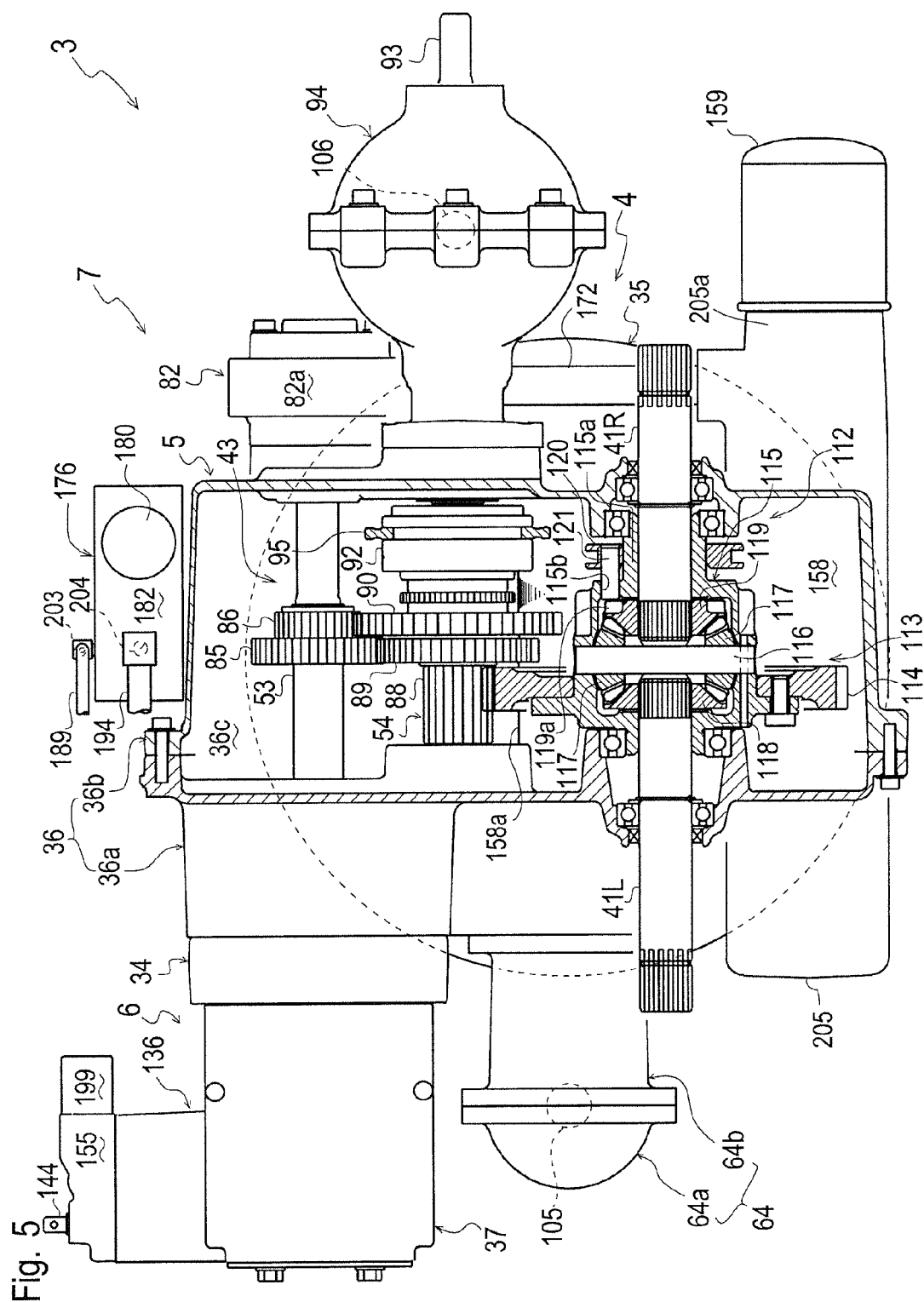
FIG. 5 is a cross sectional view of the engine-transaxle assembly taken along the Y-Y line of FIG. 3.
Figure 6:
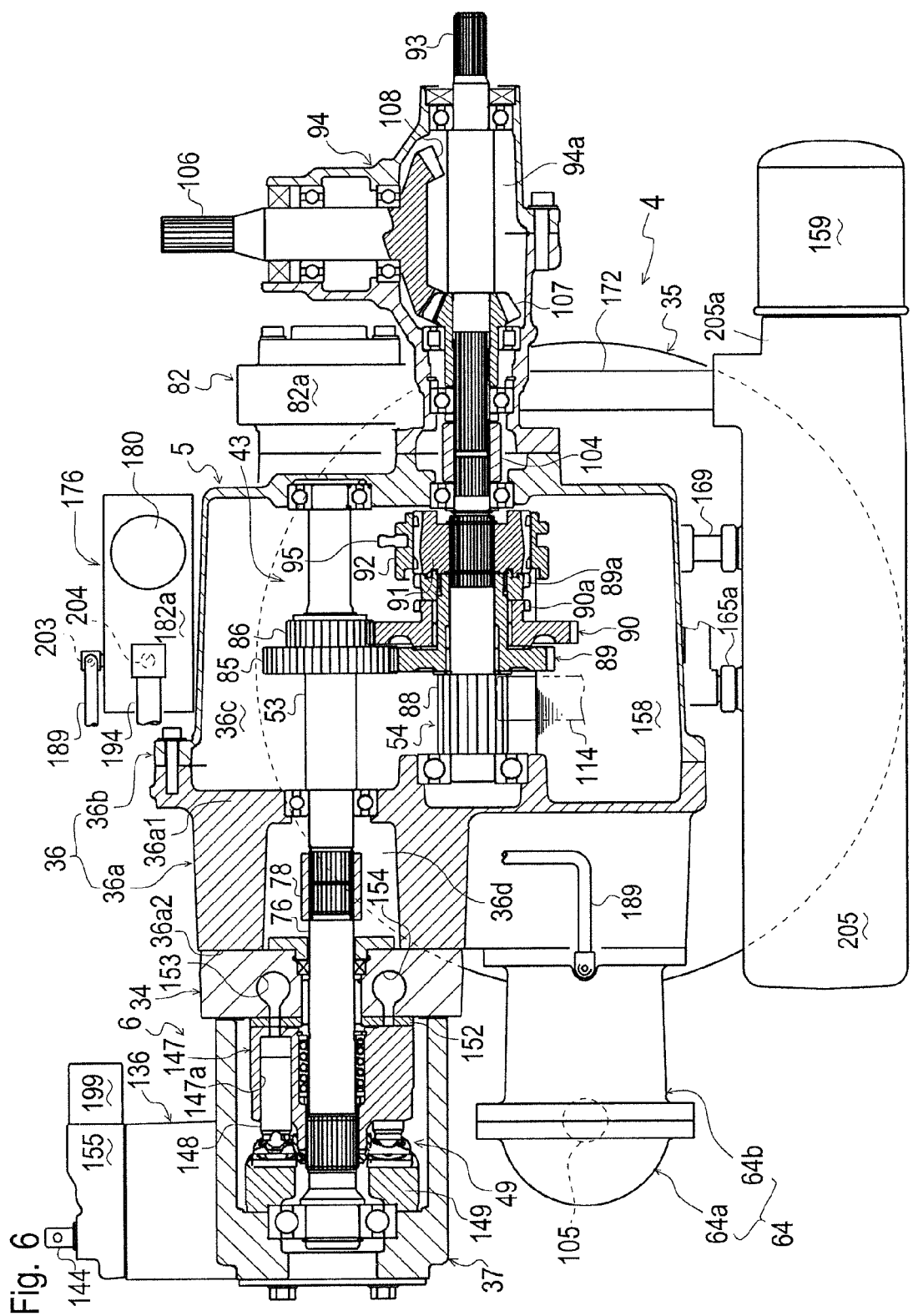
FIG. 6 is a cross sectional view of the engine-transaxle assembly taken along the Z-Z line of FIG. 3, showing a second drive train.
Figure 7:
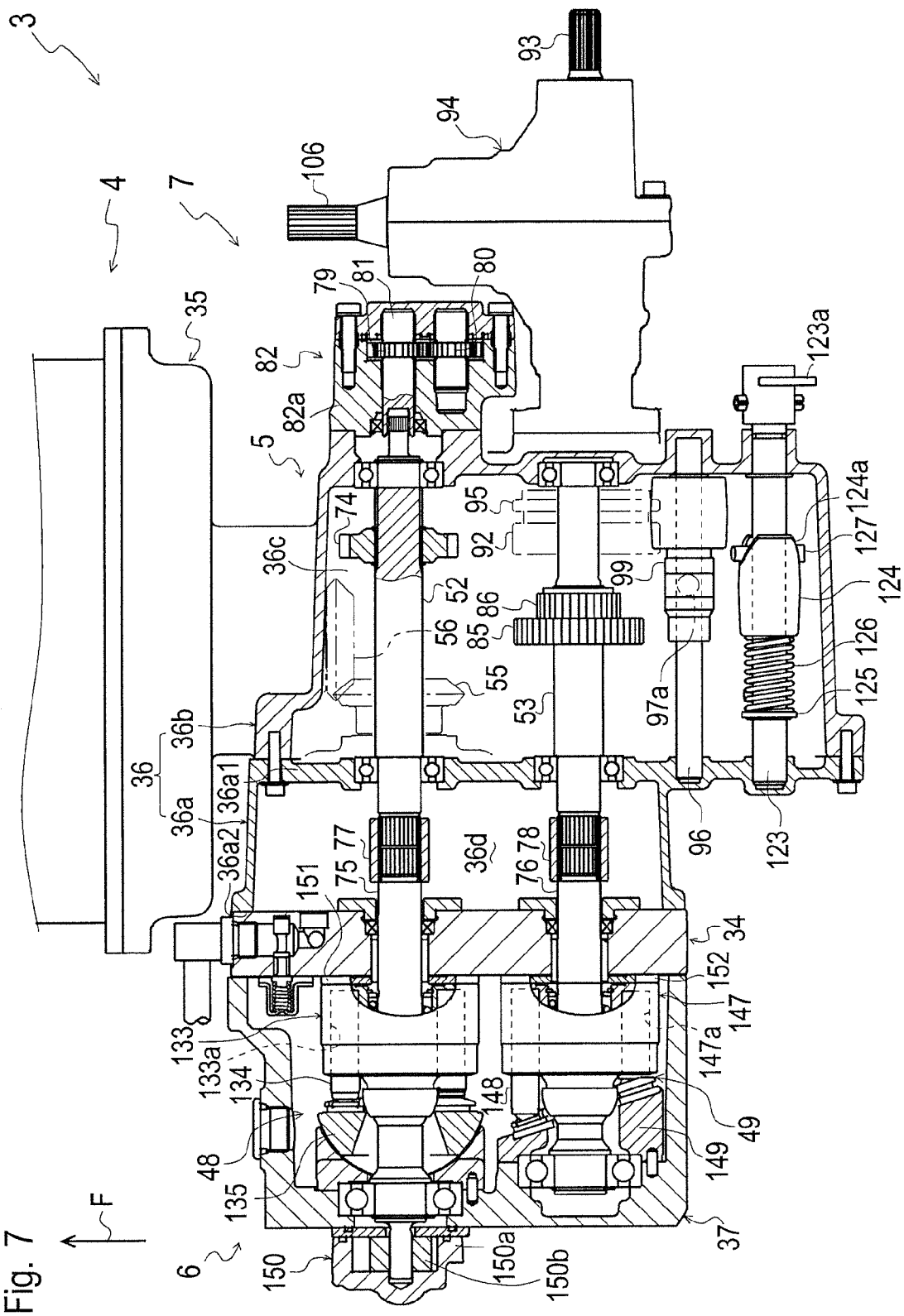
FIG. 7 is a cross sectional view of the engine-transaxle assembly taken along the U-U line of FIG. 3.

Referring to FIGS. 1, 2 and 4, a PTO clutch shaft 58 is disposed coaxially leftward from input shaft 50. The left end portion of input shaft 50 is further extended leftward from bearing wall 36a1, and a projection 50a is formed so as to project leftward from the left end of input shaft 50, and is fitted into a recess 58a formed in a right end portion of PTO clutch shaft 58 so as to be allowed to rotate relative to PTO clutch shaft 58. A wet multi-disc type PTO clutch 59 is provided on input shaft 50 and PTO clutch shaft 58 so as to be interposed between input shaft 50 and PTO clutch shaft 58. The lower front portion of side housing 36a is expanded leftward from the portion of bearing wall 36a1 with bearing 57 journaling input shaft 50 so as to form a lower side chamber 36e incorporating PTO clutch 59.

PTO clutch 59 includes an inner drum 60, an outer drum 61, friction elements 60a and 61a, a clutch piston 62, and a spring 63. Inner drum 60 is expanded radially from input shaft 50, and leftward so as to surround the end portions of input shaft 50 and PTO clutch shaft 58 fitted to each other with projection 50a in recess 58a. Friction elements 60a engage at inner peripheral edges thereof with inner drum 60 unrotatably relative to inner drum 60 and input shaft 50. Outer drum 61 is fixed on PTO clutch shaft 58 and is extended rightward so as to surround inner drum 60. Friction elements 61a engage at outer peripheral edges thereof with outer drum 61 unrotatably relative to outer drum 61 and PTO clutch shaft 58. Friction elements 60a and 61a are alternately layered in the axial direction of input shaft 50 and PTO clutch shaft 58.

Clutch piston 62 is disposed inside of outer drum 61, and is formed with a boss 62a that is axially slidably fitted on PTO clutch shaft 58. Spring 63 is wound around boss 62a of clutch piston 62 so as to bias clutch piston 62 leftward. A space between clutch piston 62 and outer drum 61 serves as a hydraulic fluid chamber 190. When fluid is supplied into hydraulic fluid chamber 190, the fluid pushes clutch piston 62 rightward against spring 63 so as to press friction elements 60a and 61a against each other, thereby engaging PTO clutch 59. When fluid is released from hydraulic fluid chamber 190, spring 63 pushes clutch piston 62 leftward so as to separate friction elements 60a and 61a from each other, thereby disengaging PTO clutch 59.

The lower front portion of side housing 36a expanded leftward from bearing wall 36a1 to define lower side chamber 36e incorporating PTO clutch 59 has a vertical left end surface 36a2, to which first PTO casing 64 is fixed. More specifically, a right casing part 64b contacts vertical left end surface 36a2 of side housing 36a at a right end thereof so as to be fixed to side housing 36a. Left and right casing parts 64a and 64b are joined to each other to constitute first PTO casing 64 defining a PTO gear chamber 64d therein. PTO clutch shaft 58 is journalled by right casing part 64b via right and left bearings 66 and 67. A left end portion of PTO clutch shaft 58 is extended leftward from left bearing 67 into PTO gear chamber 64d so as to be fixedly provided thereon with a bevel gear 68 in PTO gear chamber 64d.

A first PTO shaft 105 is extended in the longitudinal direction of utility vehicle 1 perpendicular to PTO clutch shaft 58, and is clamped between left and right casing parts 64a and 64b of first PTO casing 64 via a bearing. A front end portion of first PTO shaft 105 projects forward from first PTO casing 64 so as to be drivingly connected to a working device, e.g., a snow blower, attached to a front portion of utility vehicle 1. In PTO gear chamber 64d of first PTO casing 64, a bevel gear 69 is fixed on a rear end portion of first PTO shaft 105 and meshes with bevel gear 68.

Outer drum 61 is formed with a leftwardly extended boss 61b fitted on PTO clutch shaft 58. Right casing part 64b is expanded rightward into lower side chamber 36e of side housing 36a incorporating PTO clutch 59 so as to surround boss 61b. A PTO brake 71 is provided in lower side chamber 36e so as to be interposed between boss 61b of outer drum 61 and right casing part 64b of first PTO casing 64.

PTO brake 71 includes friction elements 61c and 64c, a brake pin 65 and a pressure disc 70. Brake pin 65 is extended leftward from clutch piston 62, and is passed through a left wall portion of outer drum 61. Friction elements 61c engage at inner peripheral edges thereof with boss 61b of outer drum 61 so as to be unrotatable relative to outer drum 61 and PTO clutch shaft 58. Friction elements 64c engage at outer peripheral edges thereof with the rightward expanded portion of right casing part 64b of first PTO casing 64 so as to be unrotatable relative to first PTO casing 64. Friction elements 61c and 64c are alternately layered in the axial direction of PTO clutch shaft 58. Pressure disc 70 is disposed rightward from all friction elements 61c and 64c, and a left end of brake pin 65 contacts pressure disc 70.

When PTO clutch 59 is engaged, clutch piston 62 with brake pin 65 is disposed at the right end position of its slidable range so as to separate friction elements 61c and 64c from one another, whereby PTO brake 71 does not act to brake first PTO shaft 105 rotated by the rotary power of input shaft 50 via engaged PTO clutch 59. When PTO clutch 59 is disengaged, clutch piston 62 with brake pin 65 is disposed at the left end position of its slidable range so as to press friction elements 61c and 64c against one another via pressure disc 70, whereby PTO brake 71 acts to brake first PTO shaft 105 isolated from the rotary power of input shaft 50 via disengaged PTO clutch 59, thereby preventing first PTO shaft 105 from rotating inertially.

Referring to FIGS. 1 to 4, counter shaft 51 is journalled at a left end thereof by bearing wall 36a1 of side housing 36a via a bearing, and at a right end thereof by the right end wall portion of main housing 36b via another bearing, thereby being spanned in a vertically middle front portion of main chamber 36c between bearing wall 36a1 of side housing 36a and the right end wall portion of main housing 36b. Gears 72 and 73 are disposed in a right portion of main chamber 36c, rightward from engine output shaft 39 when viewed in rear, are fixed on right portions of input shaft 50 and counter shaft 51, respectively, and mesh with each other so as to transmit power from input shaft 50 to counter shaft 51.

Referring to FIGS. 1 to 4 and 7, main transmission input shaft 52 is journalled at a left end portion thereof by bearing wall 36a1 of side housing 36a via a bearing, and at a right end portion thereof by the right end wall portion of main housing 36b via another bearing, thereby being spanned in an upper front portion of main chamber 36c between bearing wall 36a1 of side housing 36a and the right end wall portion of main housing 36b. A gear 74 is fixed on a right portion of main transmission input shaft 52, and meshes with gear 73 on counter shaft 51, so that gears 72, 73 and 74 transmit power from input shaft 50 to main transmission input shaft 52 via counter shaft 51.

Referring to FIGS. 4 to 7, an upper portion of side housing 36a is expanded leftward from bearing wall 36a1 so as to define an upper side chamber 36d above lower side chamber 36e incorporating PTO clutch 59 and PTO brake 71. The upper portion of side housing 36a defining upper side chamber 36d has vertical left end surface 36a2 expanded continuously from vertical left end surface 36a2 of the lower portion of side housing 36a defining lower side chamber 36e. In other words, vertical left end surface 36a2 of side housing 36a defines the left open ends of upper and lower side chambers 36d and 36e.

Referring to FIGS. 1 to 4 and 7, the left end portion of main transmission input shaft 52 is further extended rearward from bearing wall 36a1, and is spline-fitted into a coupling sleeve 77 in a front portion of upper side chamber 36d. A pump shaft 75 of HST 6 is extended coaxially leftward from main transmission input shaft 52, and is spline-fitted at a right end portion thereof into coupling sleeve 77 in the front portion of upper chamber 36d so as to be coupled to main transmission input shaft 52 via coupling sleeve 77 rotatably integrally with main transmission input shaft 52.

On the other hand, a pump housing 82a of a hydraulic device drive pump 82 is attached onto the right outer side of the right end wall portion of main housing 36b of gear transmission casing 36. Pump housing 82a journals a pump drive shaft 81 extended coaxially rightward from main transmission input shaft 52. A projection projects rightward from the right end of main transmission input shaft 52 and is spline-fitted into a left end portion of pump drive shaft 81. Pump housing 82a incorporates a drive gear 79 fixed on pump drive shaft 81 and a driven gear 80 meshing with drive gear 79. Therefore, hydraulic device drive pump 82 for supplying hydraulic fluid to later-discussed hydraulic devices (actuators) is configured as a gear pump including drive gear 79 and driven gear 80.

A first drive train 83 includes engine output shaft 39, bevel gear 55 and 56, input shaft 50, gears 72, 73 and 74, and main transmission input shaft 52. Therefore, the engine power as the rotary power of engine output shaft 39 is transmitted upward to main transmission input shaft 52 via first drive train 83, and is distributed between pump shaft 75 of HST 6 disposed leftward from main transmission input shaft 52 and pump drive shaft 81 of hydraulic device drive pump 82 disposed rightward from main transmission input shaft 52, thereby simultaneously driving HST 6 and hydraulic device drive pump 82.

Referring to FIGS. 1 to 3 and 5 to 7, sub transmission input shaft (or main transmission output shaft) 53 is disposed rearward from main transmission input shaft 52, and has an axis disposed on a horizontal plane 87 on which an axis of main transmission input shaft 52 is also disposed. Sub transmission input shaft 53 is journalled at a left end portion thereof by bearing wall 36a1 of side housing 36a via a bearing, and at a right end portion thereof by the right end wall portion of main housing 36b via another bearing, thereby being spanned in a longitudinally middle upper portion of main chamber 36c between bearing wall 36a1 and the right end wall portion of main housing 36b.

The left end portion of sub transmission input shaft 53 is further extended rearward from bearing wall 36a1, and is spline-fitted into a coupling sleeve 78 in a rear portion of upper side chamber 36d. A motor shaft 76 of HST 6 is extended coaxially leftward from sub transmission input shaft 53, and is spline-fitted at a right end portion thereof into coupling sleeve 78 in the rear portion of upper side chamber 36d so as to be coupled to sub transmission input shaft 53 via coupling sleeve 78 rotatably integrally with sub transmission input shaft 53. Therefore, axes of main transmission input shaft 52, pump shaft 75, motor shaft 76 and sub transmission input shaft 53 are disposed to have their axes on common horizontal plane 87, i.e., at an even level.

Referring to FIGS. 1 to 4, 6, 7 and 9, HST 6 includes center section 34, HST casing 37, a hydraulic pump 48 and a hydraulic motor 49. Vertical rectangular plate-shaped center section 34 contacts left end surface 36a2 of side housing 36a at a right end surface thereof, thereby being attached on the left outer side of gear transmission casing 36. Hydraulic pump 48 and hydraulic motor 49 are mounted onto a left end surface 34a of center section 34, and HST casing 37 is attached to left end surface 34a of center section 34 so as to incorporate hydraulic pump 48 and hydraulic motor 49. A pair of main fluid passages 153 and 154 are formed in center section 34 so as to fluidly connect hydraulic pump 48 and hydraulic motor 49 to each other.

Axial piston type hydraulic pump 48 having a variable displacement includes pump shaft 75, a valve plate 151, a cylinder block 133, plungers 134, and a movable swash plate 135. Horizontal pump shaft 75 joined at the right end thereof to main transmission input shaft 52 as mentioned above is passed through a front portion of center section 34. In HST casing 37, valve plate 151 is fixed onto left end surface 34a at the front portion of center section 34, and cylinder block 133 is slidably rotatably fitted onto valve plate 151, and is fixed on pump shaft 75 extended leftward from center section 34 via valve plate 151. Cylinders 133a are bored in cylinder block 133 around pump shaft 75, and plungers 134 are fitted in respective cylinders 133a reciprocally parallel to pump shaft 75. Movable swash plate 135 is pivotally supported in HST casing 37 and abuts against heads, i.e., left ends, of plungers 134 projecting from cylinder block 133.

A charge pump 150 for supplying fluid to main fluid passages 153 and 154 in center section 34 and to a later-discussed hydraulic servomechanism 136 in HST casing 37 is attached on a left outer side of HST casing 37. Charge pump 150 is a gear pump, e.g., a trochoid pump, including a pump housing 150a fixed to HST casing 37 and a gear (or rotor) 150b disposed in pump housing 150a. Pump shaft 75 is freely passed through movable swash plate 135, is journalled by HST casing 37, and is extended leftward from HST casing 37 into pump housing 150a so as to serve as a drive shaft for driving gear 150b of charge pump 150.

Figure 9:
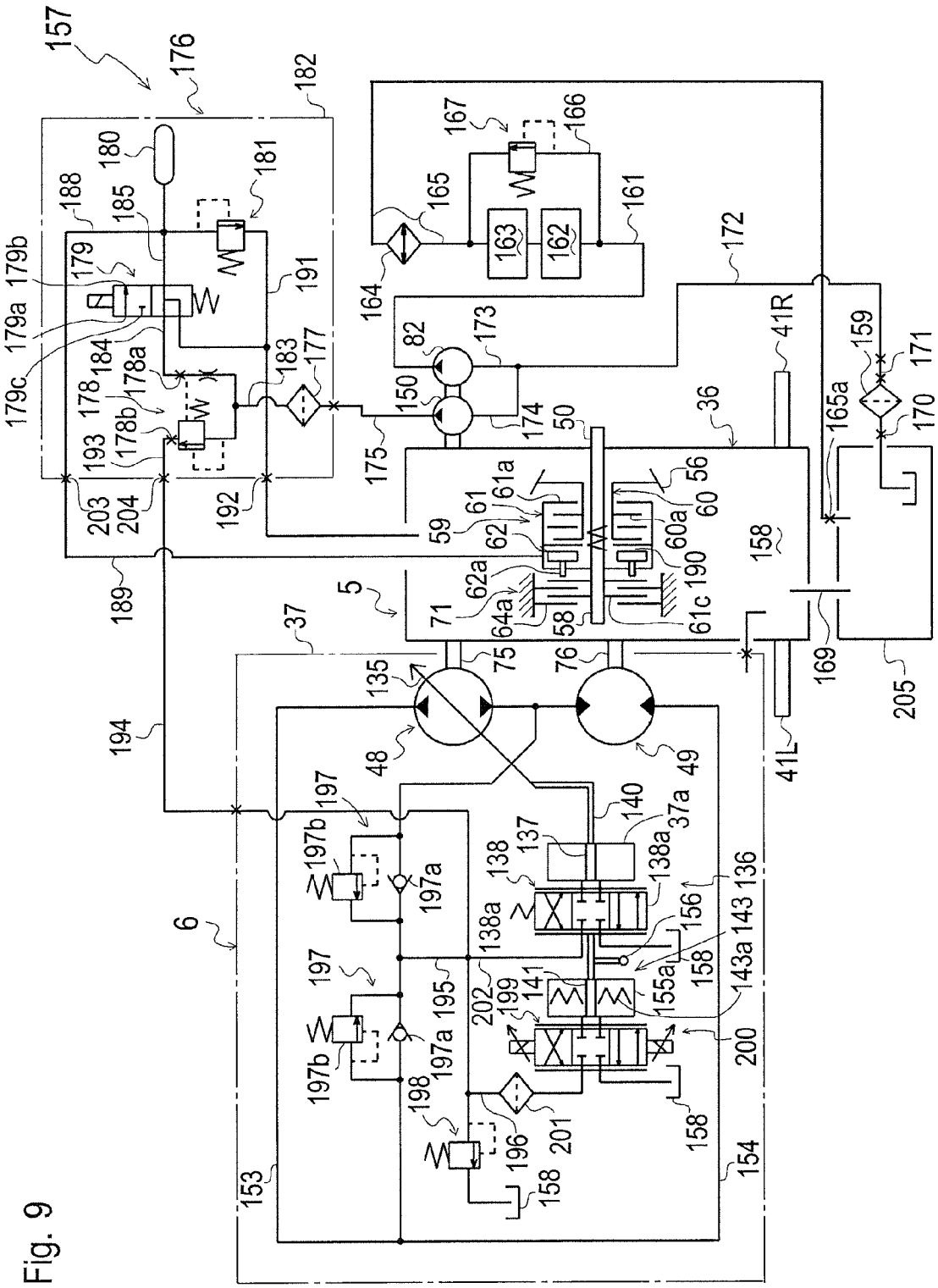
FIG. 9 is a hydraulic circuit diagram for the engine-transaxle assembly.

Referring to FIG. 4, hydraulic servomechanism 136, including a piston 137 and a proportional directive control valve 138, is assembled in HST casing 37. HST casing 37 is formed with a longitudinal cylinder 37a. Piston 137 is longitudinally slidably fitted in cylinder 37a, and is coupled to movable swash plate 135 via a connection pin 140, so that movable swash plate 135 is pivotally moved according to the longitudinal sliding of piston 137 in cylinder 37a. Proportional directive control valve 138 is configured in piston 137 so as to hydraulically control the position of piston 137 in cylinder 37a, as shown in FIG. 9. In this regard, proportional directive control valve 138 includes a spool 138a longitudinally slidably disposed in piston 137 so that the position change of spool 138a in piston 137 is defined as the shift of proportional directive control valve 138 for controlling the position of piston 137.

Referring to FIG. 4, a top cover 155 is fixed on a top portion of HST casing 37 so as to cover hydraulic servomechanism 136. A vertical HST control shaft 144 is journalled by top cover 155 and is coupled at a bottom end thereof to spool 138a in piston 137. An HST control lever 156 is fixed on a top portion of HST control shaft 144 projecting upward from top cover 155. By manipulating HST control lever 156, HST control shaft 144 rotates centered on its own vertical axis so as to slide spool 138a, i.e., shift proportional directive control valve 138, thereby changing the position of piston 137 in cylinder 37a, and thereby changing the tilt direction and angle of movable swash plate 135 so as to change the fluid delivery direction and amount of hydraulic pump 48.

Further, referring to FIG. 4, top cover 155 is formed with a longitudinal cylinder 155a, and a spool 141 is longitudinally slidably fitted in cylinder 155a, and is interlockingly connected with spool 138a and HST control shaft 144. In this regard, as shown in FIG. 9, a spring 143a is disposed in top cover 155 and HST casing 37 so as to bias spool 141 to locate spool 138a at a position to set piston 137 and movable swash plate 135 at a neutral position. Therefore, spool 141 and spring 143a constitute a neutral retaining mechanism 143 for returning piston 137, when released from an operation force, to its neutral position and for retaining piston 137 at the neutral position while it is free from an operation force.

In this regard, HST 6 is provided with a pilot pressure control mechanism 200 as shown in FIG. 9 (not shown in FIG. 4) for controlling the position of spool 141 of neutral retaining mechanism 143, thereby controlling the position of spool 138a, i.e., the state of proportional directive control valve 138 for hydraulically controlling the position of piston 137. Pilot pressure control mechanism 200 includes a proportional electromagnetic directive control valve 199 for hydraulically controlling the position of spool 141 in cylinder 155a. A controller (not shown) controls electricity applied on solenoids of proportional electromagnetic directive control valve 199 in correspondence to operation of a later-discussed sub speed control lever 100, a reverser (i.e., a manipulator for determining a traveling direction of utility vehicle 1), an accelerator (i.e., a manipulator for controlling a throttle degree of engine 4 for determining an output rotary speed of engine 4) and so on, so as to automatically control the position of spool 141, the position of spool 138a, i.e., the state of proportional directive control valve 138, and the position of piston 137, thereby automatically determining the tilt direction and angle of movable swash plate 135, i.e., the rotary direction and speed of motor shaft 76 of HST 6 so as to realize a set traveling direction and speed of utility vehicle 1.

Axial piston type hydraulic motor 49 having a fixed displacement includes motor shaft 76, a valve plate 152, a cylinder block 147, plungers 148, and a fixed swash plate 149. Horizontal motor shaft 76 joined at the right end thereof to sub transmission input shaft 53 as mentioned above is passed through a rear portion of center section 34. In HST casing 37, valve plate 152 is fixed onto left end surface 34a at the rear portion of center section 34, and cylinder block 147 is slidably rotatably fitted onto valve plate 152, and is fixed on motor shaft 76 extended leftward from center section 34 via valve plate 152. Cylinders 147a are bored in cylinder block 147 around motor shaft 76, and plungers 148 are fitted in respective cylinders 147a reciprocally parallel to motor shaft 76. Fixed swash plate 149 is settled in HST casing 37 and abuts against heads, i.e., left ends, of plungers 148 projecting from cylinder block 147.

Main fluid passages 153 and 154 fluidly connect cylinders 133a in cylinder block 133 of hydraulic pump 48 mounted on center section 34 to cylinders 147a in cylinder block 147 of hydraulic motor 49 mounted on center section 34. Therefore, pump shaft 75 is rotated together with main transmission input shaft 52 receiving power from engine 4 via first drive train 83, so as to drive hydraulic pump 48, and hydraulic motor 49 is driven by hydraulic fluid delivered from hydraulic pump 48 via main fluid passage 153 or 154, so as to rotate motor shaft 76 in the direction and speed corresponding to the set tilt direction and angle of movable swash plate 135 of hydraulic pump 48. In this way, HST 6 transmits the rotary power of main transmission input shaft 52 driven by engine 4 via first drive train 83 to sub transmission input shaft 53 so as to determine a rotary direction and speed of sub transmission input shaft 53.

Referring to FIGS. 1 to 3 and 5 to 7, a gear transmission including gears 85, 86, 89 and 90 is configured in a lateral middle portion of main chamber 36c so as to serve as sub transmission 43 driven by HST 6 serving as the main transmission. High speed drive gear 85 and low speed drive gear 86 that is diametrically smaller than high speed drive gear 85 are disposed in a laterally middle upper portion of main chamber 36c, and are fixed on sub transmission input shaft 53.

Sub transmission output shaft 54 is disposed below sub transmission input shaft 53, and is journalled at a left end portion thereof by bearing wall 36a1 of side housing 36a via a bearing, and at a right end portion thereof by the right end wall portion of main housing 36b via another bearing, thereby being spanned in a longitudinally and vertically middle portion of main chamber 36c between bearing wall 36a1 of side housing 36a and the right end wall portion of main housing 36b. High speed driven gear 89 and low speed driven gear 90 that is diametrically larger than high speed driven gear 89 are disposed in a laterally and vertically middle portion of main chamber 36c. High speed driven gear 89 is fitted at an axial boss thereof on sub transmission output shaft 54 rotatably relative to sub transmission output shaft 54, and low speed driven gear 90 is fitted on the axial boss of high speed driven gear 89 rotatably relative to high speed driven gear 89 and sub transmission output shaft 54. High speed drive and driven gears 85 and 89 mesh with each other so as to serve as a high speed gear train of sub transmission 43. Low speed drive and driven gears 86 and 90 mesh with each other so as to serve as a low speed gear train of sub transmission 43.

Sub transmission 43 also includes a spline hub 91 and a clutch slider 92. Spline hub 91 is fixed on a right portion of sub transmission output shaft 54 rightward from high and low speed driven gears 89 and 90. Clutch slider 92 is spline-fitted on spline hub 91 so as to be slidable on spline hub 91 in the axial direction of sub transmission output shaft 54 and unrotatable relative to spline hub 91 and sub transmission output shaft 54. Low speed driven gear 90 is formed on a right end portion thereof with clutch teeth 90a, and high speed driven gear 89 is formed on a right end portion thereof with clutch teeth 89a disposed between clutch teeth 90a and spline hub 91 in the axial direction of sub transmission output shaft 54.

A fork shaft 96 is extended laterally in parallel to transmission shafts 50, 51, 52, 53 and 54, and is disposed rearward from sub transmission input shaft 53. Fork shaft 96 is supported at a left end portion thereof by bearing wall 36a1 of side housing 36a, and at a right end portion thereof by the right end wall portion of main housing 36b, thereby being spanned in an upper rear portion of main chamber 36c between bearing wall 36a1 and the right end wall portion of main housing 36b. A fork 95 is engaged at an end portion thereof on clutch slider 92, and is engaged at another end portion thereof to a slide member 99 axially slidably fitted on fork shaft 96.

A vertical speed control shaft 98 is journalled by an upper rear portion of main housing 36b. A top portion of speed control shaft 98 projects upward from gear transmission casing 36 so as to be interlockingly connected to sub speed control lever 100 via a link mechanism 128, as shown in FIG. 3. In main chamber 36c, an arm 97 is fixed on a bottom end of speed control shaft 98, and is extended forward so that an engaging pin 97a provided on a front end portion of arm 97 is extended downward so as to engage with slide member 99.

As shown in FIG. 3, sub speed control lever 100 is shiftable among a low speed position 101, a neutral position 102, and a high speed position 103. When sub speed control lever 100 is set at low speed position 101, clutch slider 92 engages with clutch teeth 90a and disengages from clutch teeth 89a so as to transmit power from sub transmission input shaft (main transmission output shaft) 53 to sub transmission output shaft 54 via the low speed gear train including gears 86 and 90, thereby realizing a low speed state Lo of sub transmission 43. When sub speed control lever 100 is set at neutral position 102, clutch slider 92 disengages from both clutch teeth 89a and 90a so as to isolate sub transmission output shaft 54 from the rotary power of sub transmission input shaft 53, thereby realizing a neutral state N of sub transmission 43. When sub speed control lever 100 is set at high speed position 103, clutch slider 92 engages with clutch teeth 89a and disengages from clutch teeth 90a so as to transmit power from sub transmission input shaft 53 to sub transmission output shaft 54 via the high speed gear train including gears 85 and 89, thereby realizing a high speed state Hi of sub transmission 43.

Referring to FIGS. 1, 2, and 4 to 7, second PTO casing 94 is attached onto the right end wall portion of main housing 36b of gear transmission casing 36 at a longitudinally and vertically middle portion of gear transmission casing 36. A coupling sleeve 104 is disposed in a chamber formed by joining the right end wall portion of main housing 36b of gear transmission casing 36 and a left end wall portion of second PTO casing 94. The right end portion of sub transmission output shaft 54 is further extended rightward from the bearing in the right end wall portion of main housing 36b, and is spline-fitted into coupling sleeve 104. A PTO transmission shaft 93 is extended coaxially rightward from sub transmission output shaft 54, and is spline-fitted at a left end portion thereof into coupling sleeve 104, so that PTO transmission shaft 93 is rotatable integrally with sub transmission output shaft 54.

A right portion of second PTO casing 94 is radially expanded to define a PTO gear chamber 94a therein. PTO transmission shaft 93 is extended across PTO gear chamber 94a. A right end portion of PTO transmission shaft 93 projects rightwardly outward from a right end of second PTO casing 94. As shown in FIG. 1, a parking brake 111 is provided on the right end portion of PTO transmission shaft 93 projecting outward from second PTO casing 94. In a left portion of PTO gear chamber 94a, a bevel pinion 107 is fixed on PTO transmission shaft 93.

A second PTO shaft 106 is extended in the longitudinal direction of utility vehicle 1 perpendicular to PTO transmission shaft 93, and is journalled by a front right portion of second PTO casing 94 via bearings. The front right portion of second PTO casing 94 may be vertically inclined so as to orient second PTO shaft 106 vertically slantwise. A rear end portion of second PTO shaft 106 is disposed in PTO gear chamber 94a forward from PTO transmission shaft 93, and is fixedly provided thereon with a bevel gear 108. Bevel gear 108 meshes at a left portion thereof with a front end portion of bevel pinion 107.

A front end portion of second PTO shaft 106 projects forward from second PTO casing 94 and is spline-fitted into a coupling sleeve 109. A propeller shaft 110 is extended coaxially forward from second PTO shaft 106, and is spline-fitted at a rear end portion thereof into coupling sleeve 109, so that propeller shaft 110 is rotatable integrally with second PTO shaft 106. Alternatively, propeller shaft 110 may be flexibly connected to second PTO shaft 106 via a universal joint. Propeller shaft 29 coupled to the rear end of rear shaft 27b of input shaft 27 of front transaxle 2 via universal joint 30 as mentioned above is coupled at a rear end thereof to a front end of propeller shaft 110 via another universal joint 30. Therefore, the rotary power of sub transmission output shaft 54 is distributed to front wheels 12 via PTO transmission shaft 93, second PTO shaft 106, propeller shafts 110 and 29, and front transaxle 2, while the rotary direction of sub transmission output shaft 54 is determined by HST 6 and the rotary speed of sub transmission output shaft 54 is determined by HST 6 and sub transmission 43.

Referring to FIGS. 1 to 3, 5, 7 and 8, right and left differential output shafts 41R and 41L are extended coaxially to each other in the lateral direction of utility vehicle 1 so as to be journalled by right and left lower rear portions of gear transmission casing 36 via bearings, and are differentially connected at proximal end portions thereof to each other via a rear differential unit 113 with a differential locking mechanism 112 in a lower rear portion of main chamber 36c. Rear differential unit 113 includes a differential ring gear 114, a differential casing 115, a pinion shaft 116, differential pinions 117, and right and left differential side gears 118 and 119.

Differential casing 115 fittingly supports right and left differential output shafts 41R and 41L coaxial to each other so as to allow right and left differential output shafts 41R and 41L to rotate relative to differential casing 115. In differential casing 115, right and left bevel gears serving as right and left differential side gears 118 and 119 are fixed on respective proximal end portions of differential output shafts 41R and 41L. In differential casing 115, pinion shaft 116 having bevel pinions serving as differential pinions 117 thereon is disposed between right and left differential side gears 118 and 119, and is extended perpendicular to differential output shafts 41R and 41L so that right and left differential side gears 118 and 119 mesh with each differential pinion 117 therebetween.

Differential side gear 119 is formed with recesses 119a corresponding to later-discussed lock pins 121 of differential locking mechanism 112 disposed at either right or left side of differential unit 113. In this embodiment, differential locking mechanism 112 is disposed at the right side of differential unit 113. Therefore, differential side gear 119 having recesses 119a corresponding to lock pins 121 of differential locking mechanism 112 is fixed on right differential output shaft 41R, and differential side gear 118 having no recess corresponding to lock pins 121 of differential locking mechanism 112 is fixed on left differential output shaft 41L.

A spur gear serving as a final pinion 88 is formed (or fixed) on a left portion of sub transmission output shaft 54 leftward from high and low speed driven gears 89 and 90. A spur ring gear serving as differential ring gear 114 serving as an input gear of rear differential unit 113 is fixed on an outer peripheral surface of differential casing 115, and meshes with final pinion 88 so as to receive the rotary power from sub transmission output shaft 54.

Sub transmission 43 and rear differential unit 113 constitute a second drive train 84 extended downward in main chamber 36c of gear transmission casing 36. In other words, second drive train 84 includes sub transmission input shaft 53, high speed gears 85 and 89, low speed gears 86 and 90, sub transmission output shaft 54, final pinion 88, differential ring gear 114, differential pinions 117 and differential side gears 118 and 119 in differential casing 115, and right and left differential output shafts 41R and 41L. In this regard, sub transmission input shaft 53 also serves as main transmission output shaft 53, i.e., the output shaft of HST 6 connected coaxially to motor shaft 76 of HST 6. Therefore, the rotary power of sub transmission input shaft (or main transmission output shaft) 53 as the output power of HST 6 is transmitted downward via either the high or low gear train of sub transmission 43 to differential unit 113, and is distributed between right and left differential output shafts 41R and 41L drivingly connected to right and left rear wheels 13.

Differential locking mechanism 112 includes a differential locking slider 120 and lock pins 121. In this regard, differential casing 115 is formed with a right end boss portion 115a that is extended rightward from a vertical right end wall portion of differential casing 115 so as to be fitted on right differential output shaft 41R. Differential locking slider 120 is axially slidably fitted on right end boss portion 115a of differential casing 115. Lateral through holes 115b are bored in the vertical right end wall portion of differential casing 115. Differential side gear 119 is formed with recesses 119a corresponding to respective through holes 115b. Lock pins 121 are fixed to differential locking slider 120 and are extended horizontally leftward from differential locking slider 120 into differential casing 115 via respective through holes 115b. In this regard, lock pins 121 is constantly inserted into through holes 115b so as to engage differential locking slider 120 with differential casing 115 unrotatably relative to differential casing 115 regardless of whether differential locking slider 120 is located at a locking position or an unlocking position.

A fork shaft 123 is extended laterally in parallel to transmission shafts 50, 51, 52, 53 and 54, and is disposed rearward from fork shaft 96 for sub transmission 43. Fork shaft 123 is journalled at a left end portion thereof by bearing wall 36a1 of side housing 36a, and at a right end portion thereof by the right end wall portion of main housing 36b, thereby being spanned in the upper rear portion of main chamber 36c between bearing wall 36a1 and the right end wall portion of main housing 36b rearward from fork shaft 96. A fork 122 is engaged at an end portion thereof on differential locking slider 120, and is engaged at another end portion thereof to a cam member 124 axially slidably fitted on fork shaft 123.

A retaining ring 125 is fixed on a left portion of fork shaft 123, and a spring 126 is wound around fork shaft 123 between a left end of cam member 124 and retaining ring 125. A right end portion of cam member 124 is formed with cam recesses 124a, and pressure pins 127 are radially extended from an outer peripheral surface of fork shaft 123 so as to correspond to respective cam recesses 124a. A right end portion of fork shaft 123 projects rightwardly outward from gear transmission casing 36, and is fixedly provided thereon with a differential locking arm 123a that is operatively connected to a differential locking lever 130 via a link mechanism 129 as shown in FIG. 3.

Differential locking lever 130 is shiftable between an unlocking position 131 and a locking position 132. When differential locking lever 130 is set at unlocking position 131, pressure pins 127 are pressed against deepest ends of respective cam recesses 124a of cam member 124 biased rightward by spring 126 so as to locate cam member 124 and differential locking slider 120 at the unlocking position that is the right limit position of their slidable range, so that left end portions of lock pins 121 are disposed rightwardly outside of recesses 119a of differential side gear 119, thereby allowing differential rotation of right and left differential output shafts 41R and 41L.

By rotating differential locking lever 130 from unlocking position 131 to locking position 132, fork shaft 123 is rotated so that pressure pins 127 come to abut against the right end edge of cam member 124 outside of cam recesses 124a so as to push cam member 124 and differential locking slider 120 leftward against spring 126 to the locking position that is the left limit position of their slidable range, whereby the left end portions of lock pins 121 are engaged into recesses 119a of differential side gear 119, thereby locking right and left differential output shafts 41R and 41L in rotation to each other.

Referring to FIGS. 3 to 6 and 9 to 12, a hydraulic fluid circuit 157 of engine-transaxle assembly 3 and a lubrication system for components of engine-transaxle assembly 3 will be described. As shown in FIGS. 3, 4 and 9, a lower rear portion of gear transmission casing 36 incorporating differential unit 113 is expanded downward so as to accommodate differential ring gear 114. In this regard, referring to FIG. 3, a reference numeral "36b1" designates a lower rear portion of main housing 36b expanded to accommodate differential ring gear 114. FIG. 3 does not illustrate side housing 36a, however, a lower rear portion of side housing 36a is also expanded to correspond to expanded lower rear portion 36b1 of main housing 36b. Therefore, a lower portion of flywheel casing 35 and the lower rear portion of gear transmission casing 36 are expanded downward in comparison with the lower front portion of gear transmission casing 36, so that a space 206 is provided below the lower front portion of gear transmission casing 36 incorporating input shaft 50 between the lower portion of flywheel casing 35 and the lower rear portion of gear transmission casing 36. A reservoir tank 205 is disposed in space 206. A vertical pipe 169 is interposed between a top portion of reservoir tank 205 and a bottom wall of the lower rear portion of gear transmission casing 36 so as to allow fluid to flow therethrough, thereby holding a level 158a of a fluid sump 158 in main chamber 36c of gear transmission casing 36.

A line filter 159 is attached to reservoir tank 205. In this embodiment, line filter 159 is fixed onto an outer end surface of a right wall portion 205a of reservoir tank 205. A suction port 170 that is upwardly open C-shaped when viewed in side is formed through right wall portion 205a so as to be connected to a suction port (not shown) of line filter 159. A delivery fluid passage 171 is formed in right wall portion 205a so as to be surrounded by C-shaped suction port 170. Delivery fluid passage 171 is L-shaped when viewed in rear so as to have a lateral horizontal portion 171a and a vertical portion 171b. Lateral horizontal portion 171a of delivery fluid passage 171 is fluidly connected at a right end thereof to a delivery port 159a of line filter 159. Vertical portion 171b of delivery fluid passage 171 is open upward at a top of right wall portion 205a of reservoir tank 205.

As best understood from FIG. 4, a vertical pipe 172 is interposed between a top of vertical portion 171b of delivery fluid passage 171 and a bottom of pump housing 82a of hydraulic device drive pump 82 disposed vertically upward from right wall portion 205a of reservoir tank 205. Pipe 172 has a pipe 174 (shown in only the hydraulic circuit diagram of FIG. 9) branching therefrom to a suction port of charge pump 150. In FIG. 9, a portion of pipe 172 between a branching point to pipe 174 and the end of pipe 172 connected to a suction port of hydraulic device drive pump 82 is defined as a branching pipe 173.

Figure 11:
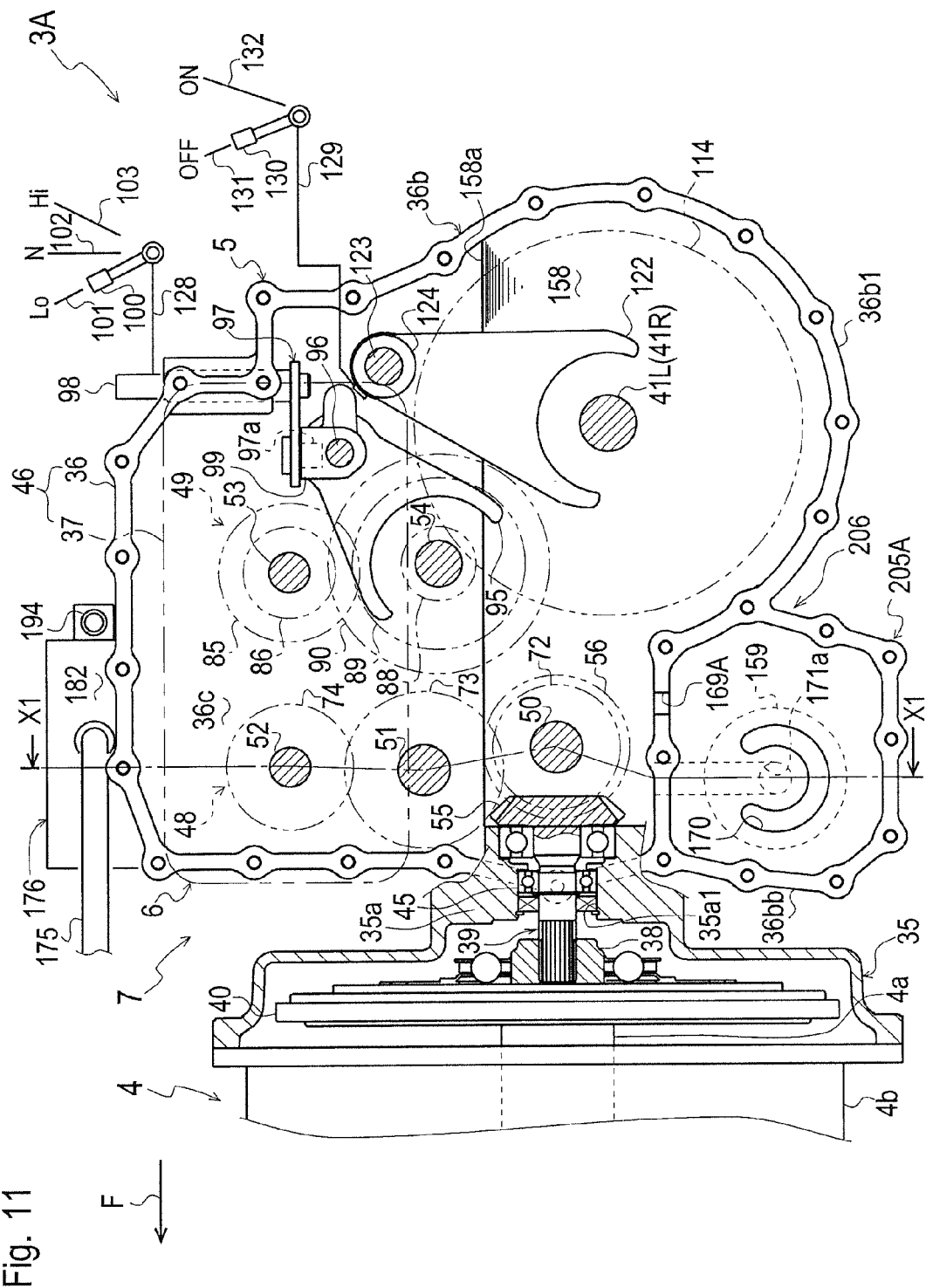
FIG. 11 is a sectional side view of an alternative engine-transaxle assembly.
Figure 12:
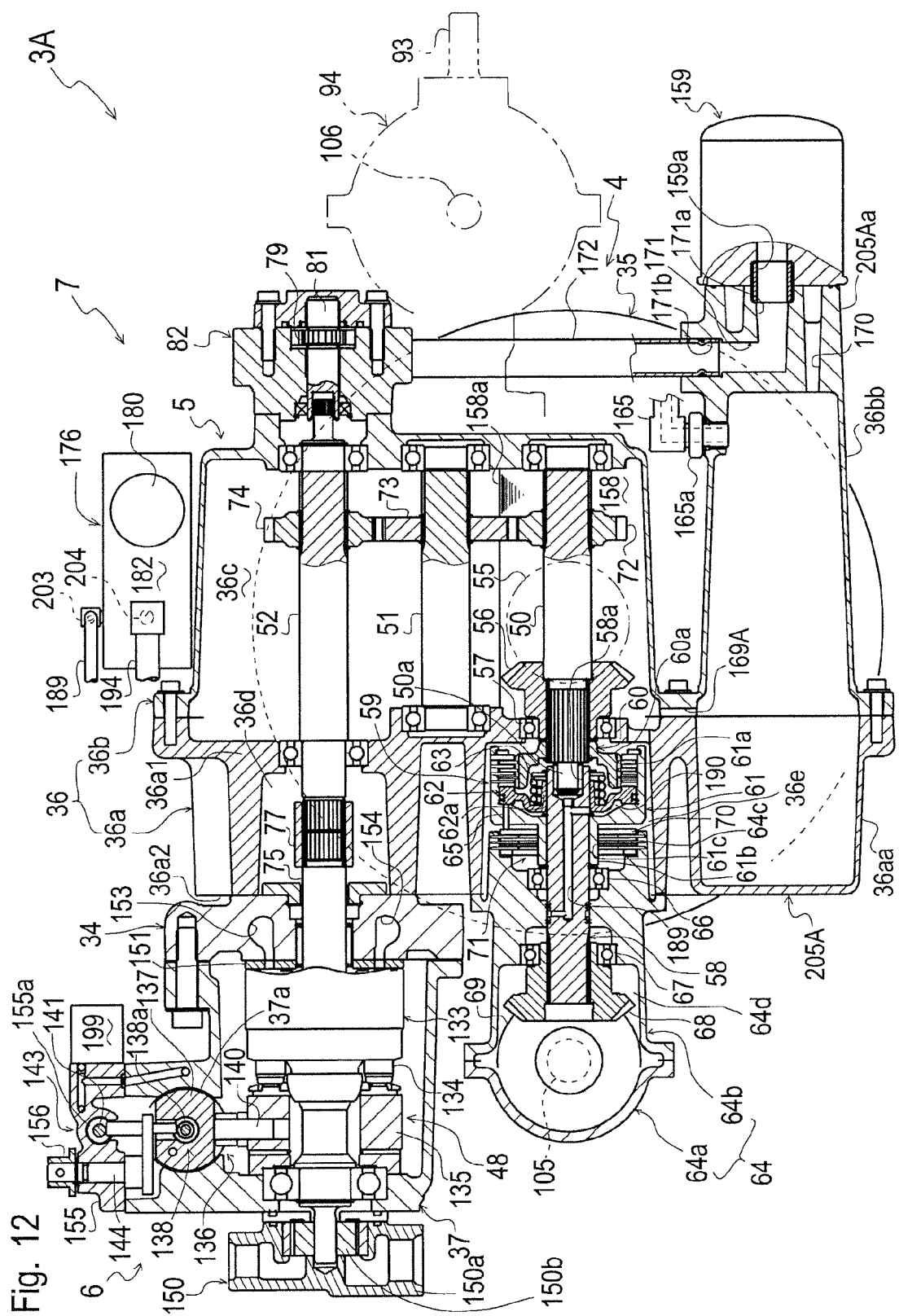
FIG. 12 is a cross sectional view of the alternative engine-transaxle assembly taken along the X1-X1 line of FIG. 11.

Referring to FIGS. 11 and 12, gear transmission casing 36 may be formed with an alternative reservoir tank 205A. In this alternative embodiment, side housing 36a and main housing 36b are formed with respective divisional parts 36aa and 36bb of reservoir tank 205 occupying space 206. By joining side housing 36a and main housing 36b to each other to constitute gear transmission casing 36, a chamber serving as reservoir tank 205A is formed in gear transmission casing 36 so as to be partitioned from main chamber 36c. In this regard, a bottom wall of the lower front portion of main chamber 36c also serves as a top wall of reservoir tank 205A. A groove 169A is bored through this wall between main chamber 36c and reservoir tank 205A so as to fluidly connect main chamber 36c to reservoir tank 205A. Groove 169A is formed on at least one of vertical end surfaces of the corresponding walls of respective housings 36a and 36b joined to the other. FIG. 11 illustrates main housing 36b formed with groove 169A, however, side housing 36a may be formed with groove 169A alternatively or additionally. A right end wall portion 205Aa is formed at a right end portion of divisional part 36bb of main housing 36b, and line filter 159 is fixed onto a right end surface of right end wall portion 205Aa. Pipe 172 is extended from right end wall portion 205Aa so as to supply fluid to hydraulic device drive pump 82 and charge pump 150, similar to pipe 172 extended from right end wall portion 205a of reservoir tank 205.

Referring to FIG. 9, a pipe 161 is extended from a delivery port of hydraulic device drive pump 82 so as to supply hydraulic fluid to hydraulic devices provided on utility vehicle 1, e.g., hydraulic actuators 162 and 163. For example, hydraulic actuator 162 is a power steering cylinder for turning front wheels 12, and hydraulic actuator 163 is a lift cylinder for rotating dump bed 11. A pipe 165 having a fluid cooler 164 thereon is extended from hydraulic actuators 162 and 163 to a drain port 165a open to reservoir tank 205 (or 205A).

A bypass pipe 166 is extended between pipe 161 and pipe 165 so as to bypass hydraulic actuators 162 and 163. A pressure regulation valve 167 is provided on bypass pipe 166 so as to regulate the hydraulic pressure of pipe 161 for supplying fluid to hydraulic actuators 162 and 163. Pressure regulation valve 167 releases a surplus pressure fluid to reservoir tank 205 (or 205A) via pipe 165.

Figure 10:
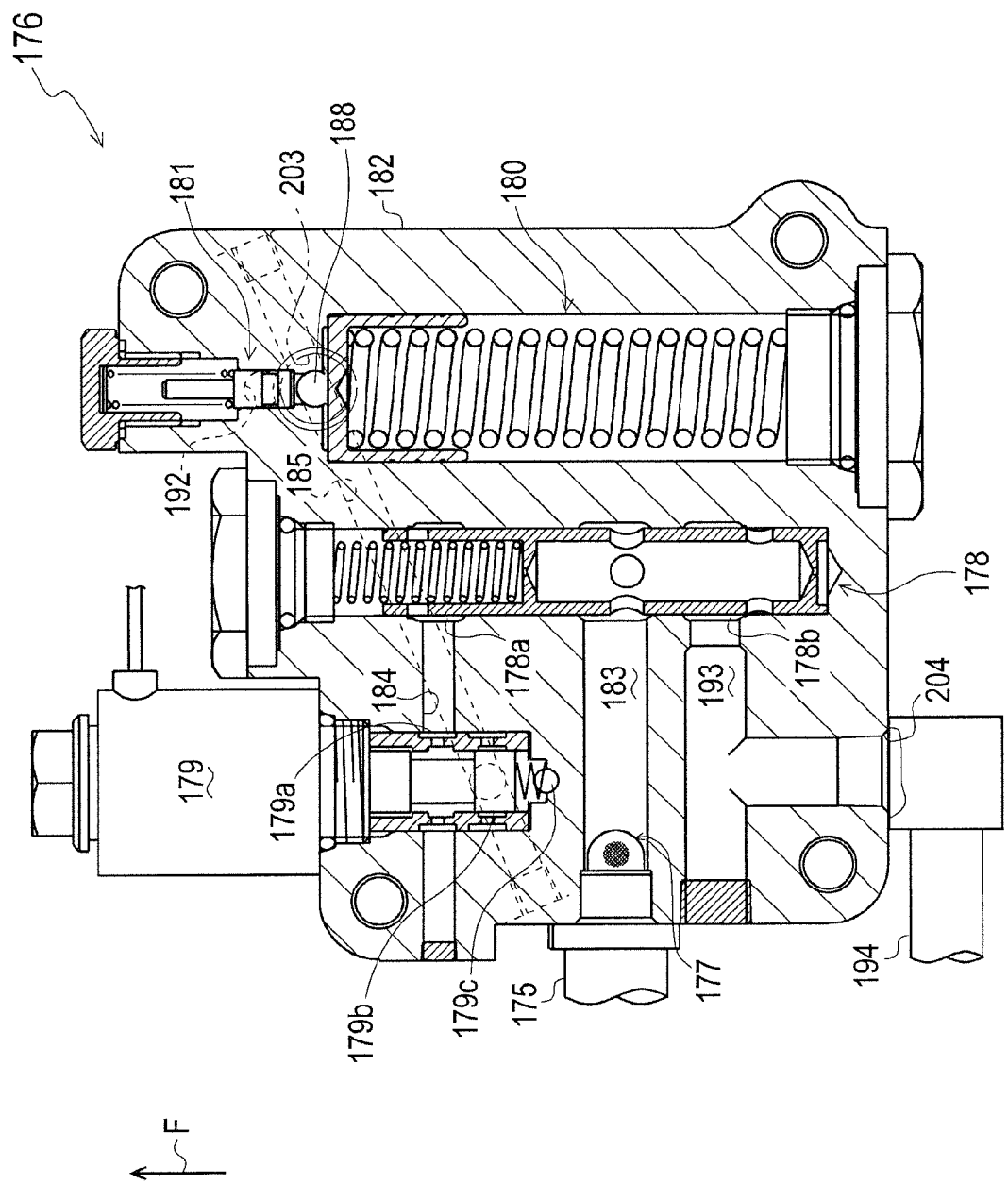
FIG. 10 is a sectional plan view of a valve unit.

Referring to FIGS. 3, 4, 9 and 10 (and 11 and 12), a pipe 175 is extended from a delivery port of charge pump 150 to a valve unit 176 having a valve unit housing 182 fixed on a right top surface of a front portion of gear transmission casing 36. As best understood from FIG. 10, valve unit 176 includes a line filter 177, a priority valve 178, an electromagnetic switching valve serving as a clutch valve 179, an accumulator 180, a relief valve 181, and valve unit housing 182. On the above-mentioned assumption that charge pump 150 is disposed on the left outer side of HST casing 37 on the left side of gear transmission casing 36, an end of pipe 175 is connected to a left end surface of a longitudinally middle portion of valve unit housing 182, as shown in FIGS. 3 and 10 (and 11). Priority valve 178 is extended longitudinally in a laterally middle portion of valve unit housing 182. A lateral horizontal fluid passage 183 is extended in the longitudinally middle portion of valve unit housing 182 rightward from the left end surface of valve unit housing 182 to an inlet port of priority valve 178. Line filter 177 is attached to the end of pipe 175 in a left end portion of fluid passage 183.

As shown in FIG. 10, clutch valve 179 is disposed in a front left portion of valve unit housing 182 forward from fluid passage 183. As shown in FIG. 10, a lateral horizontal fluid passage 184 is extended in the front left portion of valve unit housing 182 leftward from a first outlet port 178a of priority valve 178 to a suction port 179a of clutch valve 179. As shown in FIGS. 4, 5, 6 and 10 (and 12), a pipe joint serving as a first outlet port 203 is provided on a top surface of a front right portion of valve unit housing 182. A pipe 189 is extended from first outlet port 203 to hydraulic fluid chamber 190 of PTO clutch 59, as shown in FIG. 9. As shown in FIG. 10, a fluid passage 185 is extended longitudinally slantwise in a front portion of valve unit housing 182 from a valve port 179b of clutch valve 179, and a vertical fluid passage 188 is extended in the front right portion of valve unit housing 182 upward from fluid passage 185 to first outlet port 203.

As shown in FIG. 10, relief valve 181 is disposed in a front right portion of valve unit housing 182, and accumulator 180 is extended longitudinally in a right portion of valve unit housing 182 rearward from relief valve 181. Vertical fluid passage 188 extended upward from fluid passage 185 to first outlet port 203 is disposed between relief valve 181 and accumulator 180, and is connected to relief valve 181 and accumulator 180.

As understood from FIGS. 9 and 10, a vertical fluid passage 191 is extended downward from a drain port of relief valve 181 so as to have a bottom end, serving as a drain port 192 of valve unit 176, open at a bottom surface of valve unit housing 182. Further, a drain fluid passage (not shown in FIG. 10) is extended in valve unit housing 182 from a drain port 179c of clutch valve 179, and is joined to drain port 192. Gear transmission casing 36 disposed under valve unit housing 182 is provided with a fluid passage for leading fluid from drain port 192 to fluid sump 158 in main chamber 36c.

Therefore, the fluid delivered from charge pump 150 is supplied to suction port 179a of clutch valve 179 via pipe 175, line filter 177, priority valve 178, and fluid passage 193. When a solenoid of clutch valve 179 is excited, clutch valve 179 makes a flow of fluid from fluid passage 184 to fluid passage 185, thereby supplying hydraulic fluid to hydraulic fluid chamber 190 for engaging PTO clutch 59. In this state, accumulator 180 absorbs an excessive amount of fluid flowing in fluid passage 185 so as to regulate the flow of fluid to hydraulic fluid chamber 190, and relief valve 181 releases fluid of an excessive pressure to fluid sump 158 via drain port 192 so as to regulate a pressure of fluid supplied to hydraulic fluid chamber 190, thereby ensuring a proper activation of clutch piston 62 for pressing friction elements 60a and 61a without shock or damage. When the solenoid of clutch valve 179 is unexcited, clutch valve 179 connects suction port 179a and valve port 179b to drain port 179c so as to absorb fluid from hydraulic fluid chamber 190 via valve port 179b and release the fluid from drain port 179c to fluid sump 158 in main chamber 36c via drain port 192, thereby disengaging PTO clutch 59.

On the other hand, as shown in FIG. 10, a fluid passage 193 is formed in a rear left portion of valve unit housing 182 rearward from fluid passage 183. Fluid passage 193 is extended leftward from a second outlet port 178b of priority valve 178, and is bent rearward so as to have an open end provided with a pipe joint serving as a second outlet port 204 of valve unit 176 at a rear end surface of valve unit housing 182, as shown in FIGS. 4, 5, 6 and 10 (and 11 and 12). A pipe 194 is extended from second outlet port 204 so as to supply hydraulic fluid to the closed fluid circuit of HST 6 including main fluid passages 153 and 154, and to a hydraulic mechanism, including hydraulic servomechanism 136, for controlling the tilt direction and angle of movable swash plate 135 of hydraulic pump 48. Therefore, the fluid delivered from charge pump 150 is also supplied to HST 6 via pipe 175, line filter 177, priority valve 178, fluid passage 193, second outlet port 204, and pipe 194.

In this regard, priority valve 178 is configured so as to reduce the open area of first outlet port 178a in comparison with second outlet port 178b, thereby causing the fluid flow to hydraulic fluid chamber 190 of PTO clutch 59 prior to the fluid flow for HST 6, because PTO clutch 59 should be given preference for preventing friction elements 60a and 61a from seizing.

Referring to FIG. 9, HST 6 is provided with fluid passages 195, 196 and 202 branching from pipe 194. To supply fluid to the closed fluid circuit of HST 6, referring to FIG. 9, HST 6 is provided with charge fluid passage 195 (in center section 34, for example) extended from pipe 194. Charge fluid passage 195 is connected to both main fluid passages 153 and 154 via respective charge check relief valves 197. A relief valve 198 is connected to charge fluid passage 195 so as to regulate the pressure of fluid supplied to charge check relief valves 197. When hydraulic pump 48 supplies fluid to hydraulic motor 49 via one of main fluid passages 153 and 154, the other of main fluid passages 153 and 154 is hydraulically depressed so as to open a charge check valve 197a of corresponding charge check relief valve 197, thereby being supplied with fluid from charge fluid passage 195. If either main fluid passage 153 or 154 is hydraulically pressurized excessively, a relief valve 197b of corresponding charge check relief valve 197 is opened to drain fluid from corresponding main fluid passage 153 or 154 to charge fluid passage 195.

To supply cylinder 37a of servomechanism 136 with hydraulic fluid for hydraulically controlling the position of piston 137 via proportional directive control valve 138, HST 6 is provided with fluid passage 202 (in HST casing 37, for example) extended from pipe 194. Further, to supply hydraulic fluid to proportional electromagnetic directive control valve 199 of pilot pressure control mechanism 200 for automatically (electrically) controlling the position of spool 141 of neutral retaining mechanism 143 coupled to spool 138a of proportional directive control valve 138, HST 6 is provided with fluid passage 196 (in top cover 155, for example) extended from pipe 194.

In this way, referring to FIG. 4, reservoir tank 205, pumps 82 and 150, hydraulic actuators 162 and 163, valve unit 176, PTO clutch 59, and HST 6 constitute a hydraulic fluid circuit 157 in which pumps 82 and 150 suck fluid from reservoir tank 205, hydraulic device drive pump 82 delivers hydraulic fluid to hydraulic actuators 162 and 163, and charge pump 150 delivers hydraulic fluid to PTO clutch 59 and HST 6 via valve unit 176.

Regarding lubrication of components of drive trains 83 and 84, fluid of fluid sump 158 in main chamber 36c of gear transmission casing 36 is used for lubricating them. In this regard, level 158a of fluid sump 158 is controlled by reservoir tank 205 so that input shaft 50 and differential output shafts 41R and 41L disposed at the same level in the lower portion of main chamber 36c of gear transmission casing 36 are submerged in fluid sump 158 so as to submerge the gears thereon in fluid sump 158, and the other components in main chamber 36c are disposed above level 158a of fluid sump 158. Therefore, when the gears in main chamber 36c are rotated, rotating gears 56 and 72 on input shaft 50 and rotating differential ring gear 114 on differential casing 115 supporting differential output shafts 41R and 41L agitate the fluid of fluid sump 158 and splash up the fluid to the components above level 158a of fluid sump 158 directly or via the components of drive trains 83 and 84, thereby lubricating all the components in main chamber 36c.

It is further understood by those skilled in the art that the foregoing description is given to preferred embodiments of the disclosed apparatus and that various changes and modifications may be made in the invention without departing from the scope thereof defined by the following claims.

What is claimed is:

1. A power train for a vehicle, comprising:
    an engine including an engine output shaft, wherein the engine is equipped on the vehicle so as to serve as a longitudinal engine having the engine output shaft oriented in a longitudinal direction of the vehicle; and
    a transaxle comprising:
        a transmission output shaft to be oriented in a lateral direction of the vehicle so as to be drivingly connected to a drive wheel of the vehicle;
        a hydrostatic transmission and a mechanical transmission for transmitting power from the engine output shaft to the transmission output shaft, wherein the engine is joined to the transaxle so that the engine, the hydrostatic transmission and the mechanical transmission are assembled together; and
        first and second power take-off shafts for taking off power from the mechanical transmission, wherein the first and second power take-off shafts are distributed rightward and leftward from the engine.

2. The power train according to claim 1, the transaxle of the power train further comprising:
    a transmission casing of the mechanical transmission, the transmission casing including upper and lower portions, wherein the hydrostatic transmission is attached to a right or left outer side of the upper portion of the transmission casing so as to extend laterally outward from the upper portion of the transmission casing;

a common input shaft for the hydrostatic transmission and the mechanical transmission, the input shaft being drivingly connected to the engine output shaft, wherein the input shaft and the transmission output shaft are disposed at an equal level in the lower portion of the transmission casing;

a first drive train disposed in the transmission casing, wherein the first drive train is extended upward from the input shaft so as to transmit power from the input shaft to the hydrostatic transmission; and a second drive train disposed in the transmission casing, wherein the second drive train is extended downward from the hydrostatic transmission to the transmission output shaft so as to transmit power from the hydrostatic transmission to the transmission output shaft.

3. The power train according to claim 1, the transaxle of the power train further comprising:

a transmission casing of the mechanical transmission;

a flywheel casing disposed between the engine and the transmission casing, wherein the transmission casing includes a first portion close to the flywheel casing and a second portion away from the flywheel casing;

a differential unit disposed in the second portion of the transmission casing and drivingly connected to the transmission output shaft; and a reservoir tank disposed in a space below the first portion of the transmission casing between the flywheel casing and the second portion of the transmission casing and fluidly connected to an inside of the transmission casing.

4. A vehicle comprising:

a longitudinal engine including an engine output shaft to be oriented in a longitudinal direction of the vehicle; and a transaxle including:

a transmission output shaft to be oriented in a lateral direction of the vehicle so as to be drivingly connected to a drive wheel of the vehicle, a hydrostatic transmission and a mechanical transmission for transmitting power from the engine output shaft to the transmission output shaft, wherein the engine is joined to the transaxle so that the engine, the hydrostatic transmission and the mechanical transmission are assembled together, and first and second power take-off shafts for taking off power from the mechanical transmission, wherein the first and second power take-off shafts are distributed rightward and leftward from the engine.

5. The vehicle according to claim 4, the transaxle further comprising:

a transmission casing of the mechanical transmission, the transmission casing including upper and lower portions, wherein the hydrostatic transmission is attached to a right or left outer side of the upper portion of the transmission casing so as to extend laterally outward from the upper portion of the transmission casing;

a common input shaft for the hydrostatic transmission and the mechanical transmission, the input shaft being drivingly connected to the engine output shaft, wherein the input shaft and the transmission output shaft are disposed at an equal level in the lower portion of the transmission casing;

a first drive train disposed in the transmission casing, wherein the first drive train is extended upward from the input shaft so as to transmit power from the input shaft to the hydrostatic transmission; and a second drive train disposed in the transmission casing, wherein the second drive train is extended downward from the hydrostatic transmission to the transmission output shaft so as to transmit power from the hydrostatic transmission to the transmission output shaft.

6. The vehicle according to claim 4, the transaxle further comprising:

a transmission casing of the mechanical transmission;

a flywheel casing disposed between the engine and the transmission casing, wherein the transmission casing includes a first portion close to the flywheel casing and a second portion away from the flywheel casing;

a differential unit disposed in the second portion of the transmission casing and drivingly connected to the transmission output shaft; and a reservoir tank disposed in a space below the first portion of the transmission casing between the flywheel casing and the second portion of the transmission casing and fluidly connected to an inside of the transmission casing.

* * * * *